(12) United States Patent
Wei et al.

(10) Patent No.: US 12,075,377 B2
(45) Date of Patent: Aug. 27, 2024

(54) SYNCHRONIZATION SIGNAL BLOCKS FOR INTER-INTEGRATED BACKHAUL ACCESS (IAB) DISCOVERY AND MEASUREMENTS

(71) Applicant: Apple Inc., Cupertino, CA (US)

(72) Inventors: Lili Wei, Cupertino, CA (US); Qian Li, Cupertino, CA (US); Geng Wu, Cupertino, OR (US)

(73) Assignee: Apple Inc., Cupertino, CA (US)

( * ) Notice: Subject to any disclaimer, the term of this patent is extended or adjusted under 35 U.S.C. 154(b) by 430 days.

(21) Appl. No.: 17/593,740

(22) PCT Filed: Mar. 27, 2020

(86) PCT No.: PCT/US2020/025504
§ 371 (c)(1),
(2) Date: Sep. 23, 2021

(87) PCT Pub. No.: WO2020/198692
PCT Pub. Date: Oct. 1, 2020

(65) Prior Publication Data
US 2022/0174630 A1    Jun. 2, 2022

Related U.S. Application Data

(60) Provisional application No. 62/825,404, filed on Mar. 28, 2019.

(51) Int. Cl.
*H04W 56/00* (2009.01)
(52) U.S. Cl.
CPC .............................. *H04W 56/0015* (2013.01)

(58) Field of Classification Search
CPC .................. H04W 56/0015; H04W 56/001
See application file for complete search history.

(56) References Cited

U.S. PATENT DOCUMENTS

2018/0092139 A1    3/2018  Novlan et al.
2021/0367660 A1*  11/2021  Jo .......................... H04W 72/53

OTHER PUBLICATIONS

[No Author Listed], "3rd Generation Partnership Project; Technical Specification Group Radio Access Network; NR; NR and NG-RAN Overall Description; Stage 2 (Release 15)," 3GPP TS 38.300 V 15.1.0, Mar. 2018, 71 pages.
[No Author Listed], "3rd Generation Partnership Project; Technical Specification Group Radio Access Network; NR; Study on Integrated Access and Backhaul; (Release 16) The present" 3GPP TR 38.874 V 16.0.0, Dec. 2018, 111 pages.
Ericsson, "SSB-based IAB node discovery and measurement," 3GPP TSG-RAM WG1 #96, R1-1902410, Athens, Greece, Feb. 25-Mar. 1, 2019, 9 pages.

(Continued)

*Primary Examiner* — Vinncelas Louis
(74) *Attorney, Agent, or Firm* — Fish & Richardson P.C.

(57) ABSTRACT

Systems, devices, and techniques for operating Integrated Access and Backhaul (IAB) nodes are described. A described technique includes transmitting, by an IAB-node, first synchronization signal blocks (SSBs) for access user equipment (UEs); and transmitting, by the IAB-node, second SSBs for inter-IAB-node discovery and measurement. The technique can include measuring, by the IAB-node, one or more third SSBs for inter-IAB-node discovery and measurement, and attaching to another IAB-node that is discovered based on the measuring.

21 Claims, 19 Drawing Sheets

(56) References Cited

OTHER PUBLICATIONS

Huawei, "Physical Layer Design for NR IAB," 3GPP TSG RAN WG1 Meeting #94, R1-1808101, Gothenburg Sweden, Aug. 20-24, 2018, 14 pages.
International Preliminary Report on Patentability in International Appln. No. PCT/US2020/025504, dated Oct. 7, 2021, 10 pages.
International Search Report and Written Opinion in International Appln. No. PCT/US2020/025504, dated Jul. 14, 2020, 18 pages.
NTT DOCOMO, Inc. "Extensions of SSBs for inter-IAB-node discovery and measurements," 3GPP TSG RAN WG1 Ad-Hoc Meeting 1901, R1-1900958, Taipei, Jan. 21-25, 2019, 5 pages.
Qualcomm Incorporated, "Enhancements to support NR backhaul links," 3GPP TSG RAN WG1 Meeting #94b, R1-1811256, Chengdu, China, Oct. 8-Oct. 12, 2018, 21 pages.
Ad-hoc chair, "Chairman's notes of AI 7.2.2 NR-based Access to Unlicensed Spectrum," 3GPP TSG-RAN WG1 Ad-Hoc Meeting 1901, R1-1901419, Taipei, Taiwan, Jan. 21-25, 2019, 9 pages.
Ad-hoc Chair, "Chairman's notes of AI 7.2.2 Study on NR-based Access to Unlicensed Spectrum," 3GPP TSG-RAN WG1 Meeting #96, Tdoc R1-1903629, Athens, Greece, Feb. 25-Mar. 1, 2019, 8 pages.

\* cited by examiner

SYNCHRONIZATION SIGNAL BLOCKS FOR INTER-INTEGRATED BACKHAUL ACCESS (IAB) DISCOVERY AND MEASUREMENTS

CROSS-REFERENCE TO RELATED APPLICATION

This disclosure is a National Stage Application under 35 U.S.C. § 371 and claims the benefit of International Application No. PCT/US2020/025504, filed on Mar. 27, 2020, which claims the benefit of the priority of U.S. Provisional Patent Application No. 62/825,404, entitled "SYNCHRONIZATION SIGNAL BLOCKS FOR INTER-INTEGRATED BACKHAUL ACCESS (IAB) DISCOVERY AND MEASUREMENTS" and filed on Mar. 28, 2019. The above-identified applications are incorporated herein by reference in their entireties.

TECHNICAL FIELD

This disclosure relates generally to wireless communication systems.

BACKGROUND

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Systems, devices, and techniques for operating Integrated Access and Backhaul (IAB) nodes are described. A described technique includes transmitting, by an IAB-node, first synchronization signal blocks (SSBs) for access user equipment (UEs); and transmitting, by the IAB-node, second SSBs for inter-IAB-node discovery and measurement. The technique can include measuring, by the IAB-node, one or more third SSBs for inter-IAB-node discovery and measurement, and attaching to another IAB-node that is discovered based on the measuring. Other implementations include corresponding systems, apparatus, and computer programs to perform the actions of methods defined by instructions encoded on computer readable storage.

These and other implementations can include one or more of the following features. In some implementations, the first SSBs and the second SSBs have a same periodicity. In some implementations, the first SSBs and the second SSBs have a different periodicity. In some implementations, the first SSBs and the second SSBs are transmitted on the same frequency raster. In some implementations, the first SSBs and the second SSBs are transmitted on different frequency rasters. In some implementations, each of the second SSBs is confined within a five millisecond half frame. The IAB-node can be among a group of IAB-nodes. Transmitting the second SSBs for inter-IAB-node discovery and measurement can include using time-orthogonal SSB resources such that different ones of the IAB-nodes transmit SSBs for discovery and measurement at different times. Transmitting the second SSBs for inter-IAB-node discovery and measurement can include using time-overlapping SSB resources such that different IAB-nodes transmit SSBs for discovery and measurement at overlapping times. Implementations can include measuring one or more third SSBs for inter-IAB-node discovery and measurement based on a muting pattern; and muting transmission of the second SSBs according to a muting pattern when measuring the one or more third SSBs. Measuring one or more third SSBs for inter-IAB-node discovery can include performing measurements in one or more SSB measurement time configuration (SMTC) windows. In some implementations, the IAB-node is among a group of IAB-nodes (N), where N is a number, and a number of SMTC windows configured for measuring of the IAB-nodes is based on N. In some implementations, the muting pattern includes a SSB periodicity of T milliseconds and an inter-IAB SMTC periodicity of N*T milliseconds. In some implementations, the muting pattern includes a SSB periodicity of T milliseconds and an inter-IAB SMTC periodicity of (N+1)*T milliseconds.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
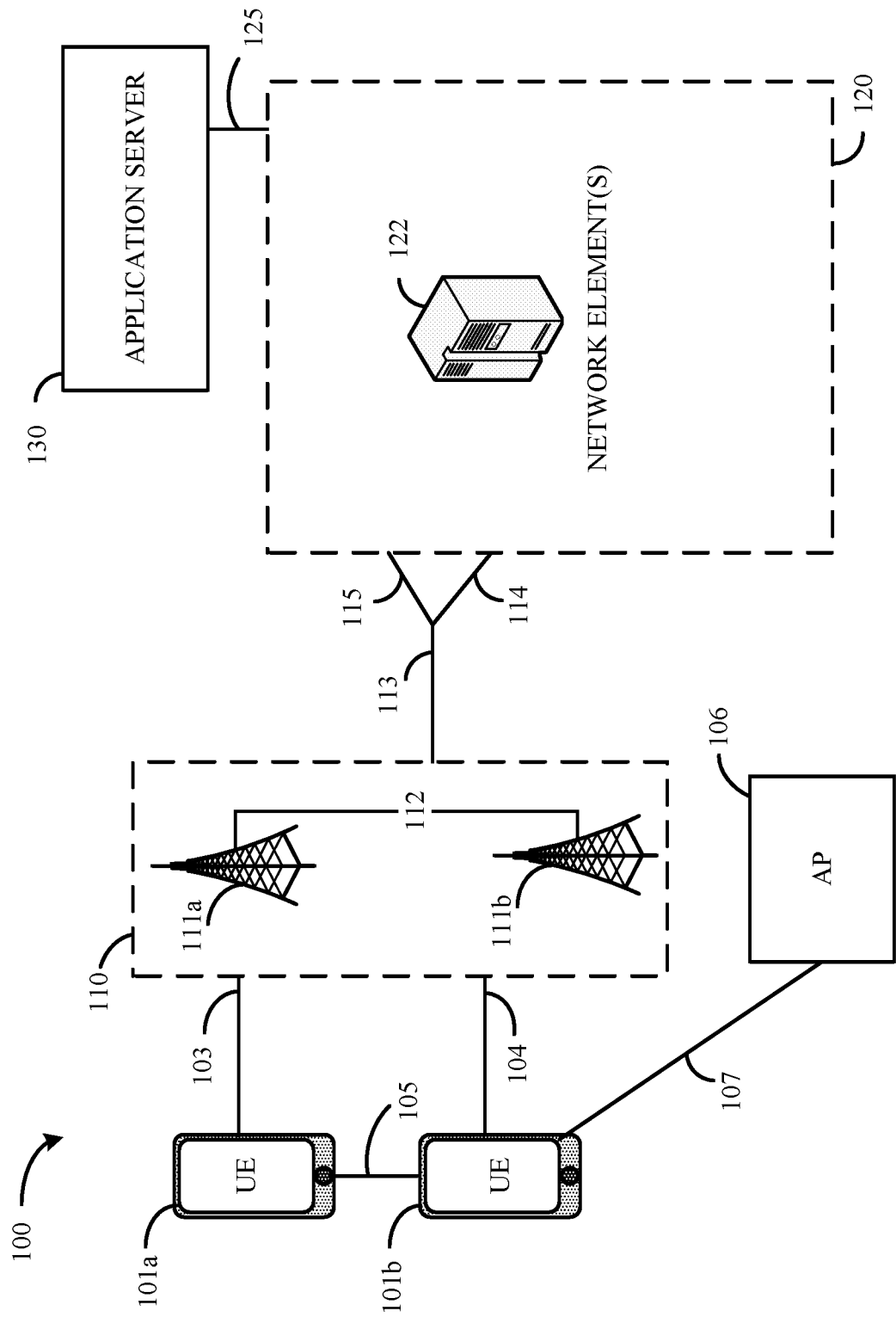
FIG. 1 illustrates an example of a wireless communication system.

FIG. 1 illustrates an example of a wireless communication system 100. For purposes of convenience and without limitation, the example system 100 is described in the context of the LTE and 5G NR communication standards as defined by the Third Generation Partnership Project (3GPP) technical specifications. However, other types of communication standards are possible.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with RAN 110. The RAN 110 can include one or more RAN nodes 111a and 111b (collectively referred to as "RAN nodes 111" or "RAN node 111"). In some implementations, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The RAN 110 can include one or more RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, road side units (RSUs), and the like, and can include ground stations (e.g., terrestrial access points) or satellite stations providing coverage within a geographic area (e.g., a cell), among others. As used herein, the term "NG RAN node" may refer to a RAN node 111 that operates in a 5G NR system 100 (for example, a gNB), and the term "E-UTRAN node" may refer to a RAN node 111 that operates in an LTE or 4G system 100 (e.g., an eNB). In some implementations, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

The RAN nodes 111 and the UEs 101 can be configured for multiple-input and multiple-output (MIMO) communications, including single or multi-beam communications. For example, a UE 101 can receive transmissions from one RAN node 111 at a time or from multiple RAN nodes 111 at the same time. The RAN nodes 111 and the UEs 101 can use beamforming for the UL, DL, or both. For example, one or more RAN nodes 111 can transmit (TX) a beam towards a UE 101, and the UE 101 can receive data via one or more TX beams at the same time. In some implementations, each of the RAN nodes 111 can be configured as a Transmission and Reception Point (TRP). The RAN 110 can provide a high-layer signaling protocol for configuring beamforming such as by providing transmission configuration indication (TCI) state configuration information.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

The RAN nodes 111 can transmit to the UEs 101 over various channels. Various examples of downlink communication channels include Physical Broadcast Channel (PBCH), Physical Downlink Control Channel (PDCCH), and Physical Downlink Shared Channel (PDSCH). Other types of downlink channels are possible. The UEs 101 can transmit to the RAN nodes 111 over various channels. Various examples of uplink communication channels include Physical Uplink Shared Channel (PUSCH), Physical Uplink Control Channel (PUCCH), and Physical Random Access Channel (PRACH). Other types of uplink channels are possible.

In some implementations, a downlink resource grid can be used for downlink transmissions from any of the RAN nodes 111 to the UEs 101, while uplink transmissions can utilize similar techniques. The grid can be a frequency grid or a time-frequency grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks. In some implementations, a physical resource block (PRB) can include a number of resource blocks. A PCB can be used as a unit in a frequency-domain resource allocation for channels such as PDSCH.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARD) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH can convey scheduling information of different types. Scheduling information can include downlink resource scheduling, uplink power control instructions, uplink resource grants, and indications for paging or system information. The RAN nodes 111 can transmit one or more downlink control information (DCI) messages on the PDCCH to provide scheduling information, such as allocations of one or more PRBs, for downlink channels, uplink channels, or both.

In some implementations, the PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of DCI and the channel condition. In some implementations, there can be four or more different PDCCH formats defined with different numbers of CCEs (e.g., aggregation level, L=1, 2, 4, or 8).

In some implementations, the PDCCH is transmitted via on one or more CORESETs. A CORESET can correspond to a set of time-frequency resources. A CORESET can provide one or more locations where a UE 101 can receive PDCCH. In some implementations, CORESETs are semi-statically configured by the network.

Figure 2:
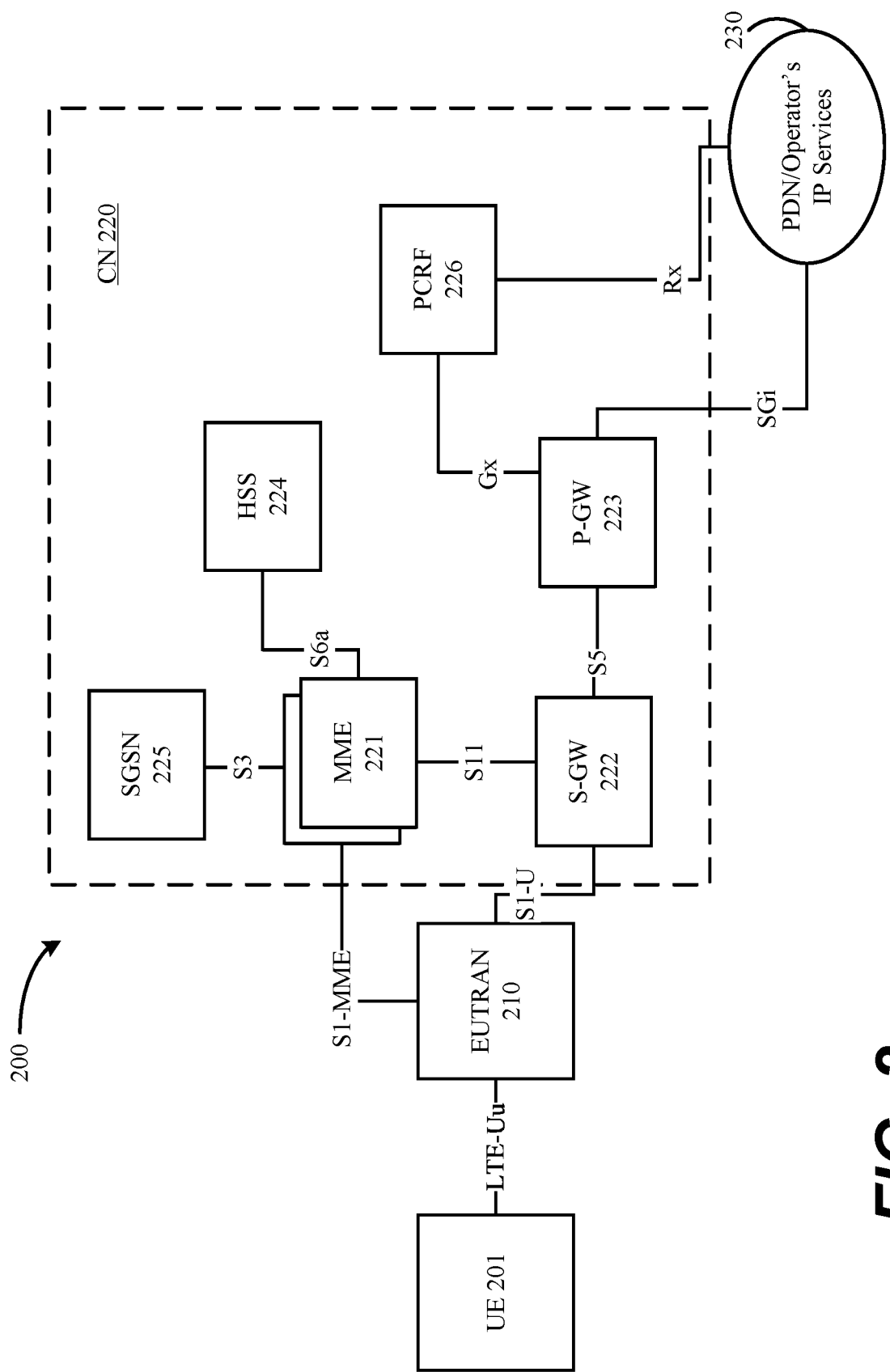
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
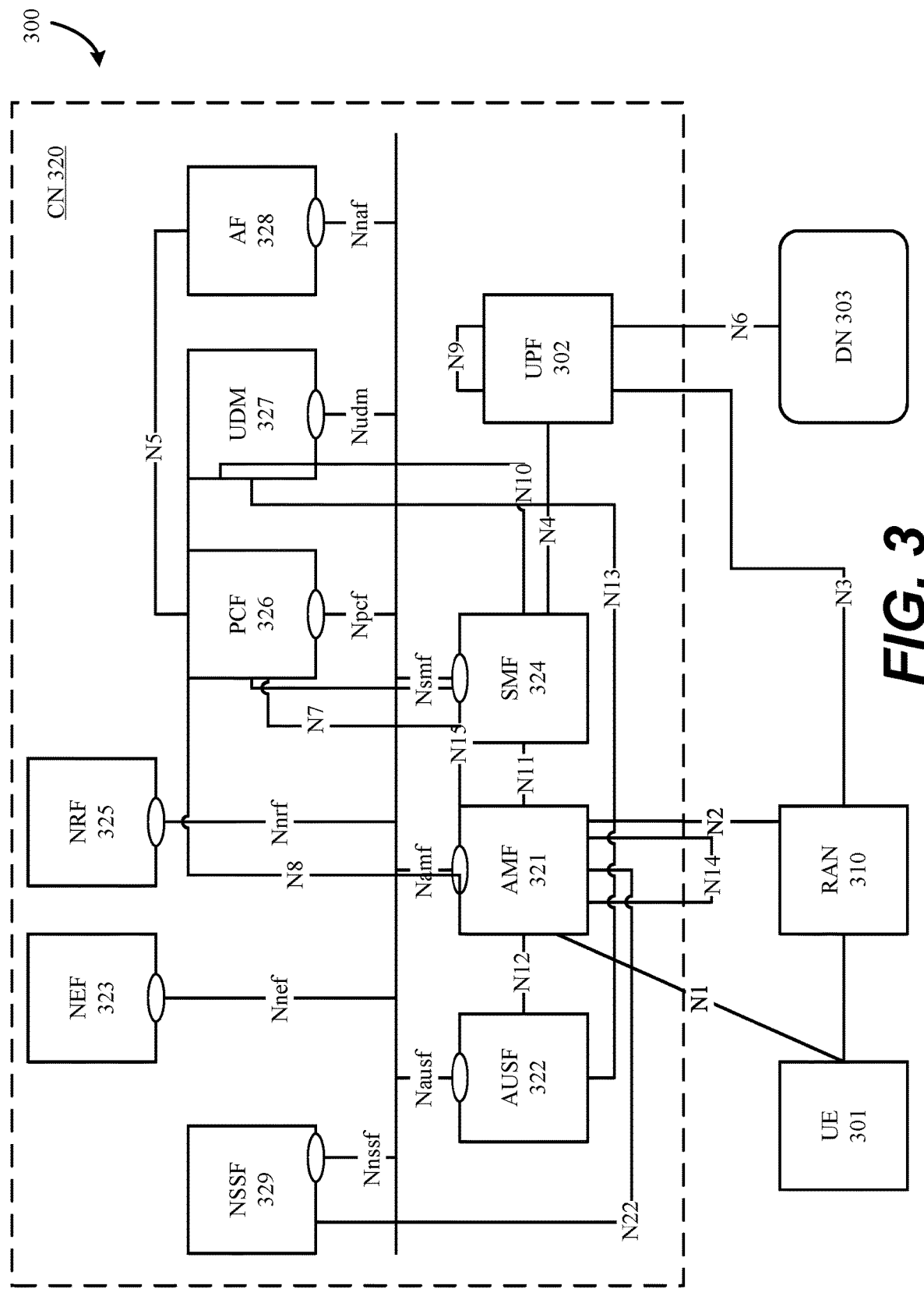
FIG. 3 illustrates another example architecture of a system including a core network.

In some implementations, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP or XnAP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120. The application server 130 can use an IP communications interface 125 to communicate with one or more network elements 122.

In some implementations, the CN 120 may be a 5G core network (referred to as "5GC 120" or "5G core network 120"), and the RAN 110 may be connected with the CN 120 using a next generation interface 113. In some implementations, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5G core network are discussed in more detail with regard to FIG. 3.

In some implementations, the CN 120 may be an EPC (referred to as "EPC 120" or the like), and the RAN 110 may be connected with the CN 120 using an S1 interface 113. In some implementations, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

In some implementations, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

In some implementations, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications.

In some implementations, an individual RAN node 111 may represent individual gNB distributed units (DUs) that are connected to a gNB central unit (CU) using individual F1 interfaces (not shown in FIG. 1). In some implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 may include an EMM sublayer, and an mobility management context may be established in the UE 201 and the MME 221 when an attach procedure is successfully completed. The mobility management context may be a data structure or database object that stores mobility management-related information of the UE 201. The MMES 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMES 221; handling of UE 201 time zone functions as specified by the MMES 221; and MME selection for handovers to E-UTRAN 3GPP access network, among other functions. The S3 reference point between the MMES 221 and the SGSN 225 may enable user and bearer information exchange for inter-3GPP access network mobility in idle or active states, or both.

The HSS 224 may include a database for network users, including subscription-related information to support the network entities' handling of communication sessions. The EPC 220 may include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP communications interface 125 (see, e.g., FIG. 1). In some implementations, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously; a RAN 310, which may be the same or similar to the RAN 110 and RAN 210 discussed previously, and which may include RAN nodes 111 discussed previously; and a data network (DN) 303, which may be, for example, operator services, Internet access or 3rd party services; and a 5GC 320. The 5GC 320 may include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which may include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which may include or be a N2 reference point between the RAN 310 and the AMF 321. In some implementations, the AMF 321 may be a termination point of NAS (N1) signaling and perform NAS ciphering and integrity protection.

AMF 321 may also support NAS signaling with a UE 301 over a N3 inter-working function (IWF) interface (referred to as the "N3IWF"). The N3IWF may be used to provide access to untrusted entities. The N3IWF may be a termination point for the N2 interface between the RAN 310 and the AMF 321 for the control plane, and may be a termination point for the N3 reference point between the RAN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some implementations, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some implementations, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be RAN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a RAN 310 signaling connection (e.g., N2 and/or N3 connections) for the UE 301. Establishment of a N2 connection between the RAN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the RAN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some implementations, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which may include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 may include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM front end, which is in charge of processing credentials, location management, subscription management and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 may include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

In some implementations, there may be additional or alternative reference points or service-based interfaces, or both, between the network function services in the network functions. However, these interfaces and reference points have been omitted from FIG. 3 for clarity. In one example, the CN 320 may include a Nx interface, which is an inter-CN interface between the MME (e.g., MME 221) and the AMF 321 in order to enable interworking between CN 320 and CN 220. Other example interfaces or reference points may include a N5g-EIR service-based interface exhibited by a 5G-EIR, a N27 reference point between the NRF in the visited network and the NRF in the home network, or a N31 reference point between the NSSF in the visited network and the NSSF in the home network, among others.

In some implementations, the components of the CN 220 may be implemented in one physical node or separate physical nodes and may include components to read and execute instructions from a machine-readable or computer-readable medium (e.g., a non-transitory machine-readable storage medium). In some implementations, the components of CN 320 may be implemented in a same or similar manner as discussed herein with regard to the components of CN 220. In some implementations, NFV is utilized to virtualize any or all of the above-described network node functions using executable instructions stored in one or more computer-readable storage mediums, as described in further detail below. A logical instantiation of the CN 220 may be referred to as a network slice, and individual logical instantiations of the CN 220 may provide specific network capabilities and network characteristics. A logical instantiation of a portion of the CN 220 may be referred to as a network sub-slice, which can include the P-GW 223 and the PCRF 226.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice may include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. While the network can support large number of slices, the UE need not support more than 8 slices simultaneously in some implementations.

A network slice may include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some implementations, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSATs. Moreover, an AMF 321 instance serving an individual UE 301 may belong to each of the network slice instances serving that UE.

Network slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional or local policies based on awareness of a particular slice that the UE 301 is requesting to access. During the initial context setup, the NG-RAN 310 is informed of the slice for which resources are being requested.

Figure 4:
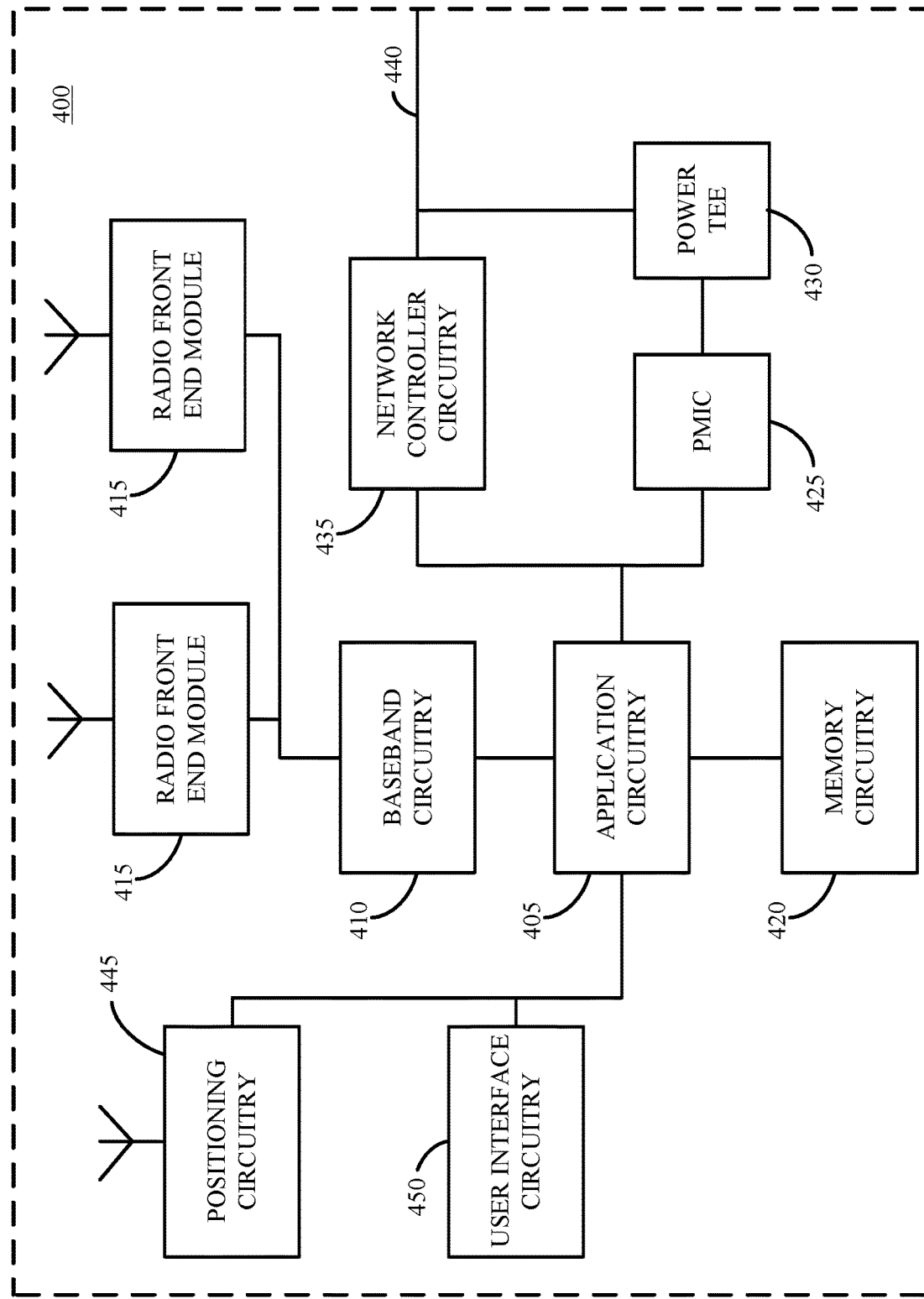
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 or AP 106 shown and described previously, an application server 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD), MultiMediaCard (MMC), Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some implementations, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some implementations, the application circuitry 405 may include, or may be, a special-purpose processor or controller configured to carry out the various techniques described here. In some implementations, the system 400 may not utilize application circuitry 405, and instead may include a special-purpose processor or controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) or deep learning (DL) accelerators, or both. In some implementations, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some implementations, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

Figure 5:
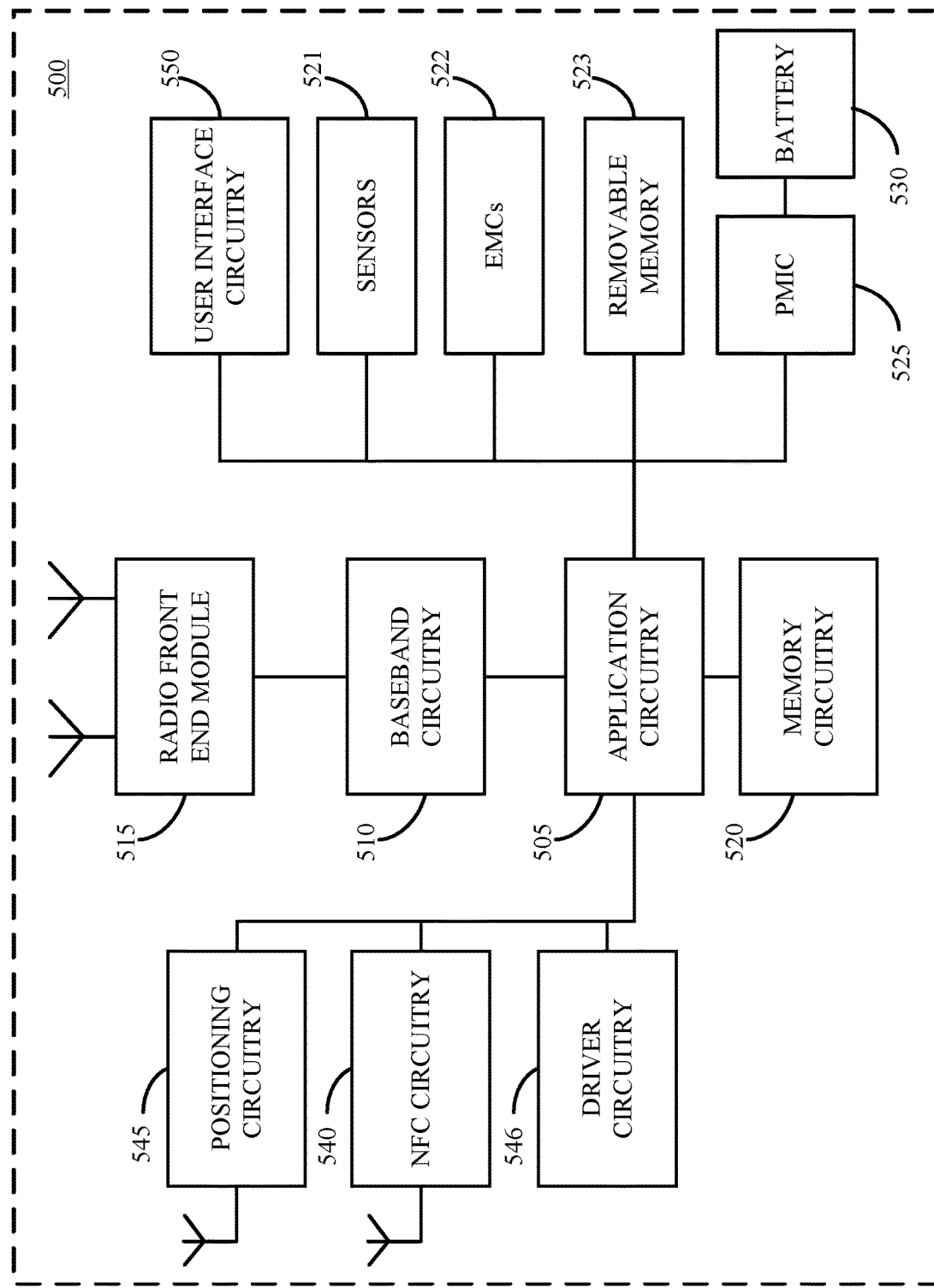
FIG. 5 illustrates an example of a platform or device.

FIG. 5 illustrates an example of a platform 500 (or "device 500"). In some implementations, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, In some implementations, the platform 500 may include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some implementations, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 may include, or may be, a special-purpose processor/controller to carry out the techniques described herein. In some implementations, the application circuitry 505 may be a part of a system on a chip (SoC) in which the application circuitry 505 and other components are formed into a single integrated circuit, or a single package.

In some implementations, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some implementations, the application circuitry 505 may include logic blocks or logic fabric, and other interconnected resources that may be programmed to perform various functions, such as the procedures, methods, functions described herein. In some implementations, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state drive (SSD), hard disk drive (HDD), a micro HDD, resistance change memories, phase change memories, holographic memories, or chemical memories, among others.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others. The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data)

about the detected events to one or more other devices, modules, or subsystems. Examples of such sensors include inertial measurement units (IMUS) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some implementations, the platform 500 is configured to operate one or more EMCs 522 based on one or more captured events, instructions, or control signals received from a service provider or clients, or both.

In some implementations, the interface circuitry may connect the platform 500 with positioning circuitry 545. The positioning circuitry 545 includes circuitry to receive and decode signals transmitted or broadcasted by a positioning network of a GNSS. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 545 may include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC Idle state, where it disconnects from the network and does not perform operations such as channel quality feedback or handover. This can allow the platform 500 to enter a very low power state, where it periodically wakes up to listen to the network and then powers down again. In some implementations, the platform 500 may not receive data in the RRC Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some implementations the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some implementations, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Figure 6:
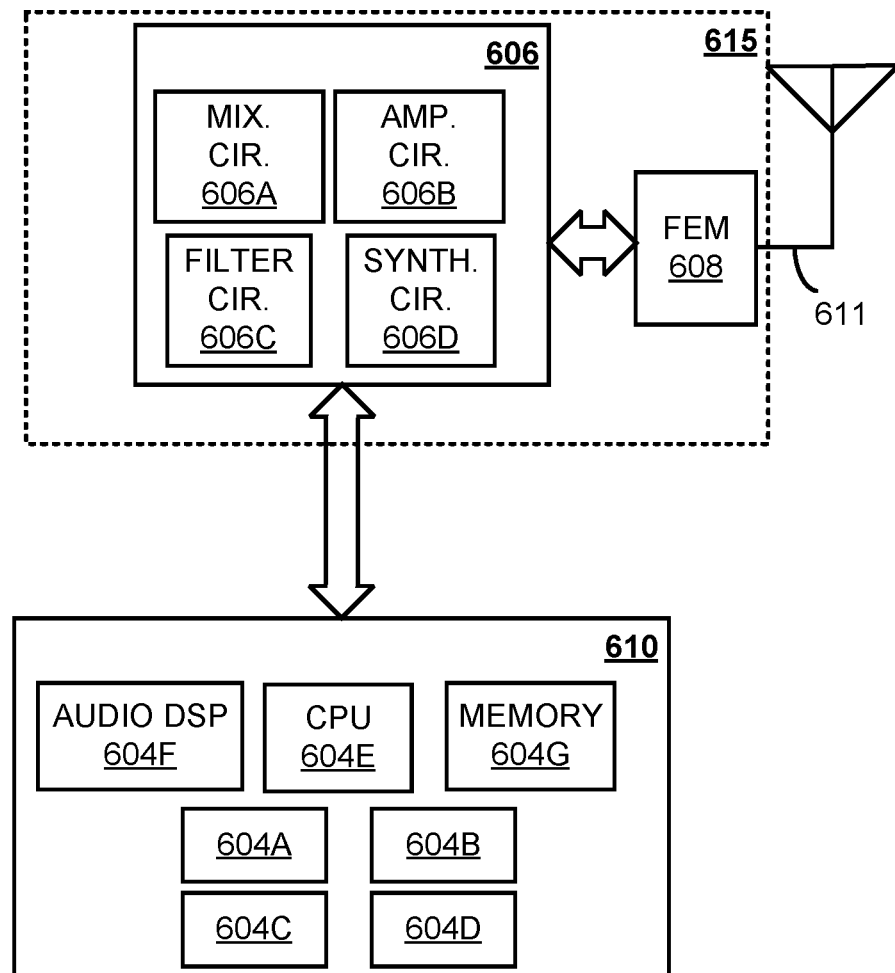
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, and antenna array 611 coupled together.

The baseband circuitry 610 includes circuitry configured to carry out various radio or network protocol and control functions that enable communication with one or more radio networks using the RF circuitry 606. The radio control functions may include, but are not limited to, signal modulation and demodulation, encoding and decoding, and radio frequency shifting. In some implementations, modulation and demodulation circuitry of the baseband circuitry 610 may include Fast-Fourier Transform (FFT), precoding, or constellation mapping and demapping functionality. In some implementations, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3 G baseband processor 604A, a 4 G or LTE baseband processor 604B, a 5 G or NR baseband processor 604C, or some other baseband processor(s) 604D for other existing generations, generations in development or to be developed in the future (e.g., sixth generation (6G)). In some implementations, some or all of the functionality of baseband processors 604A-D may be included in modules stored in the memory 604G and executed using one or more processors such as a Central Processing Unit (CPU) 604E. In some implementations, some or all of the functionality of baseband processors 604A-D may be provided as hardware accelerators (e.g., FPGAs or ASICs) loaded with the appropriate bit streams or logic blocks stored in respective memory cells. In some implementations, the memory 604G may store program code of a real-time OS (RTOS) which, when executed by the CPU 604E (or other processor), is to cause the CPU 604E (or other processor) to manage resources of the baseband circuitry 610, schedule tasks, or carry out other operations. In some implementations, the baseband circuitry 610 includes one or more audio digital signal processors (DSP) 604F. An audio DSP 604F can include elements for compression and decompression and echo cancellation and may include other suitable processing elements in some implementations.

In some implementations, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 5); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi components, and/or the like); and a power management interface to send and receive power or control signals to and from the PMIC 525.

In some implementations (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some implementations, the baseband circuitry 610 may include protocol processing circuitry with one or more instances of control circuitry (not shown) to provide control functions for the digital baseband circuitry or radio frequency circuitry (e.g., the radio front end modules 615).

In some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In some implementations, the PHY layer functions include the aforementioned radio control functions. In some implementations, the protocol processing circuitry operates or implements various protocol layers or entities of one or more wireless communication protocols. For example, the protocol processing circuitry may operate LTE protocol entities or 5 G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some implementations, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some implementations, the components of the baseband circuitry 610 may be suitably combined in a single chip or chipset, or disposed on a same circuit board. In some implementations, some or all of the constituent components of the baseband circuitry 610 and RF circuitry 606 may be implemented together such as, for example, a system on a chip (SoC) or System-in-Package (SiP). In some implementations, some or all of the constituent components of the baseband circuitry 610 may be implemented as a separate SoC that is communicatively coupled with and RF circuitry 606 (or multiple instances of RF circuitry 606). In some implementations, some or all of the constituent components of the baseband circuitry 610 and the application circuitry 405, 505 may be implemented together as individual SoCs mounted to a same circuit board (e.g., a "multi-chip package").

In some implementations, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some implementations, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some implementations, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some implementations, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, the mixer circuitry 606a of the receive signal path may comprise passive mixers.

In some implementations, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some implementations, the mixer circuitry 606a of the receive signal path and the mixer circuitry 606a of the transmit signal path may include two or more mixers and may be arranged for quadrature downconversion and upconversion, respectively. In some implementations, the mixer circuitry 606a of the receive signal path and the mixer circuitry 606a of the transmit signal path may include two or more mixers and may be arranged for image rejection (e.g., Hartley image rejection). In some implementations, the mixer circuitry 606a of the receive signal path and the mixer circuitry 606a of the transmit signal path may be arranged for direct downconversion and direct upconversion, respectively. In some implementations, the mixer circuitry 606a of the receive signal path and the mixer circuitry 606a of the transmit signal path may be configured for super-heterodyne operation.

In some implementations, the output baseband signals and the input baseband signals may be analog baseband signals. In some implementations, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606. In some dual-mode examples, a separate radio IC circuitry may be provided for processing signals for each spectrum, although the techniques described here are not limited in this respect.

In some implementations, the synthesizer circuitry 606d may be a fractional-N synthesizer or a fractional N/N+1 synthesizer, although other types of frequency synthesizers may be used. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some implementations, the synthesizer circuitry 606d may be a fractional N/N+1 synthesizer.

In some implementations, frequency input may be provided by a voltage controlled oscillator (VCO), although that is not a requirement. Divider control input may be provided by either the baseband circuitry 610 or the application circuitry 405/505 depending on the desired output frequency. In some implementations, a divider control input (e.g., N) may be determined from a look-up table based on a channel indicated by the application circuitry 405, 505.

The synthesizer circuitry 606d of the RF circuitry 606 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some implementations, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some implementations, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
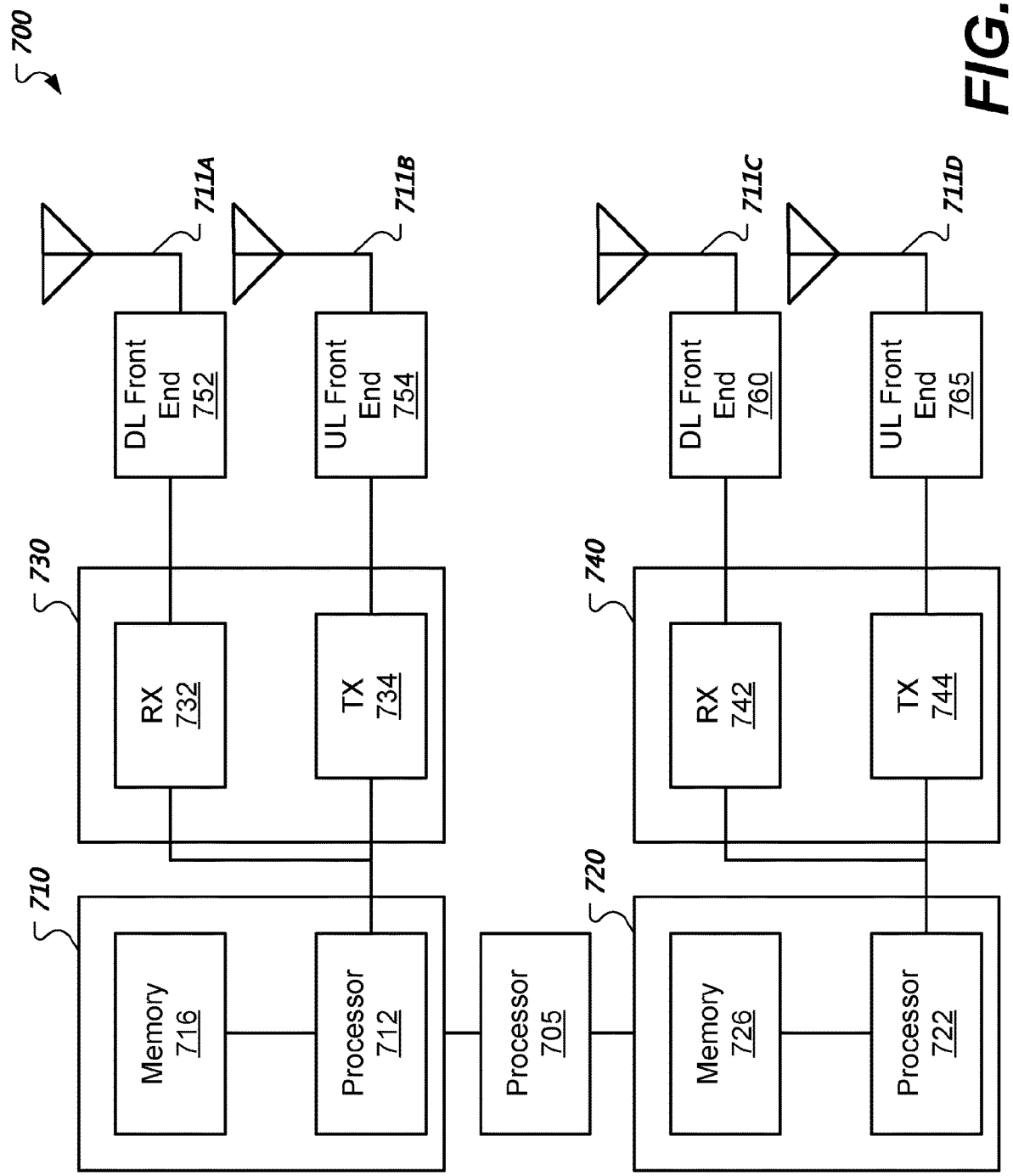
FIG. 7 illustrates example components of cellular communication circuitry.

FIG. 7 illustrates example components of communication circuitry 700. In some implementations, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 711A, 711B, 711C, and 711D. In some implementations, the communication circuitry 700 includes or is communicatively coupled to dedicated receive chains, processors, or radios, or combinations of them, for multiple RATs (e.g., a first receive chain for LTE and a second receive chain for 5 G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5 G NR. In some implementations, a processor 705, such as an application processor can interface with the modems 710, 720.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 may include circuitry for transmitting and receiving radio signals. For example, the RF front end 730 includes RX circuitry 732 and TX circuitry 734. In some implementations, the receive circuitry 732 is in communication with a DL front end 752, which may include circuitry for receiving radio signals from one or more antennas 711A. The transmit circuitry 734 is in communication with a UL front end 754, which is coupled with one or more antennas 711B.

Similarly, the modem 720 includes one or more processors 722 and a memory 726 in communication with the one or more processors 722. The modem 720 is in communication with an RF front end 740, which may correspond to or be a part of to the RFEM 415 and 515 of FIGS. 4 and 5. The RF front end 740 may include circuitry for transmitting and receiving radio signals. For example, the RF front end 740 includes receive circuitry 742 and transmit circuitry 744. In some implementations, the receive circuitry 742 is in communication with a DL front end 760, which may include circuitry for receiving radio signals from one or more antennas 711C. The transmit circuitry 744 is in communication with a UL front end 765, which is coupled with one or more antennas 711D. In some implementations, one or more front-ends can be combined. For example, a RF switch can selectively couple the modems 710, 720 to a single UL front end 772 for transmitting radio signals using one or more antennas.

The modem 710 may include hardware and software components for time division multiplexing UL data (e.g., for NSA NR operations), as well as the various other techniques described herein. The processors 712 may include one or more processing elements configured to implement various features described herein, such as by executing program instructions stored on the memory 716 (e.g., a non-transitory computer-readable memory medium). In some implementations, the processor 712 may be configured as a programmable hardware element, such as a FPGA or an ASIC. In some implementations, the processors 712 may include one or more ICs that are configured to perform the functions of processors 712. For example, each IC may include circuitry configured to perform the functions of processors 712.

The modem 720 may include hardware and software components for time division multiplexing UL data (e.g., for NSA NR operations), as well as the various other techniques described herein. The processors 722 may include one or more processing elements configured to implement various features described herein, such as by executing instructions stored on the memory 726 (e.g., a non-transitory computer-readable memory medium). In some implementations, the processor 722 may be configured as a programmable hardware element, such as a FPGA or an ASIC. In some implementations, the processor 722 may include one or more ICs that are configured to perform the functions of processors 722.

Figure 8:
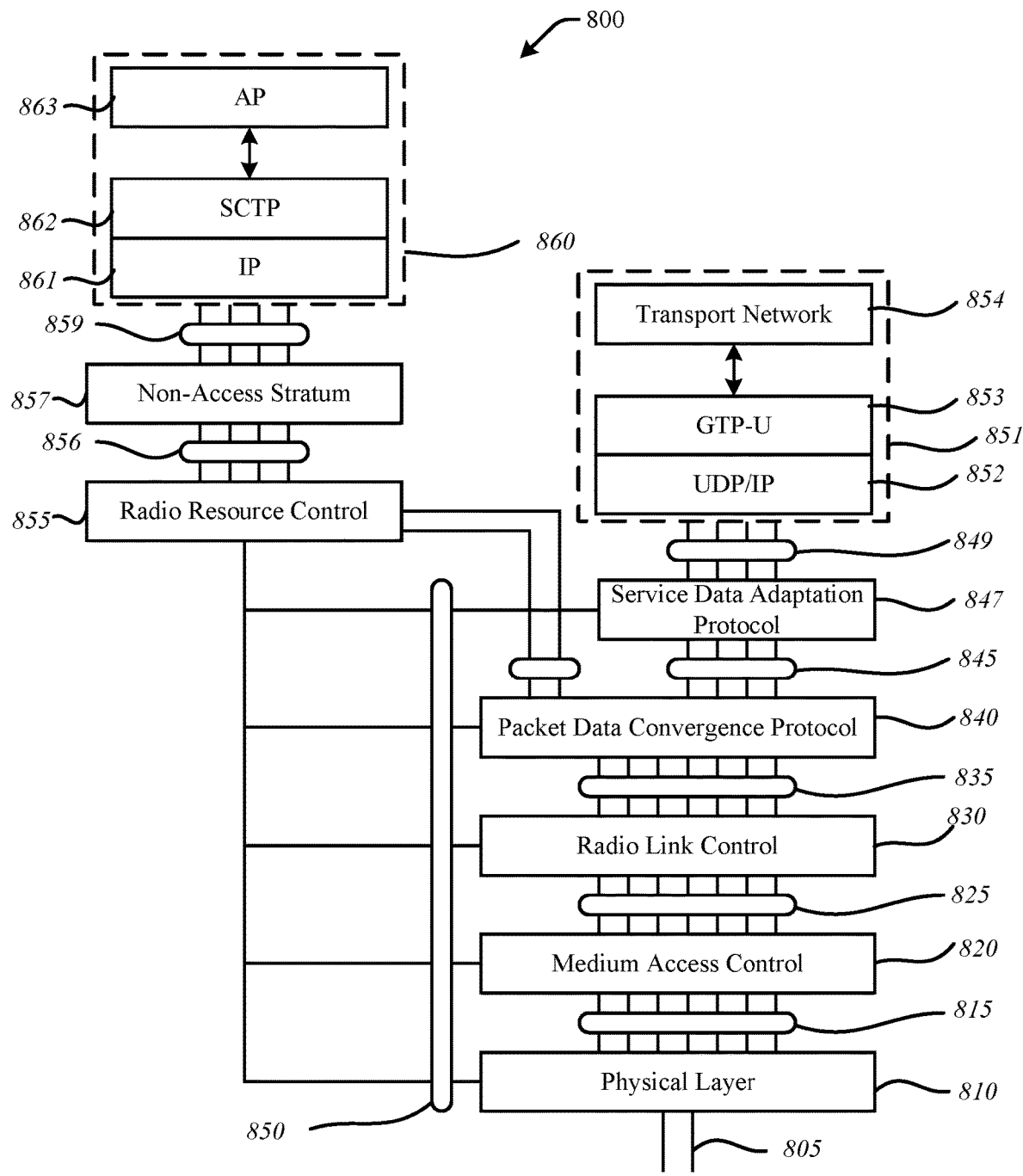
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5 G NR system standards and the LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some implementations, an instance of PHY 810 may process requests from and provide indications to an instance of MAC 820 using one or more PHY-SAP 815. In some implementations, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some implementations, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some implementations, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some implementations, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some implementations, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some implementations, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some implementations, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863. In some implementations, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In some implementations, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data comprising a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 9:
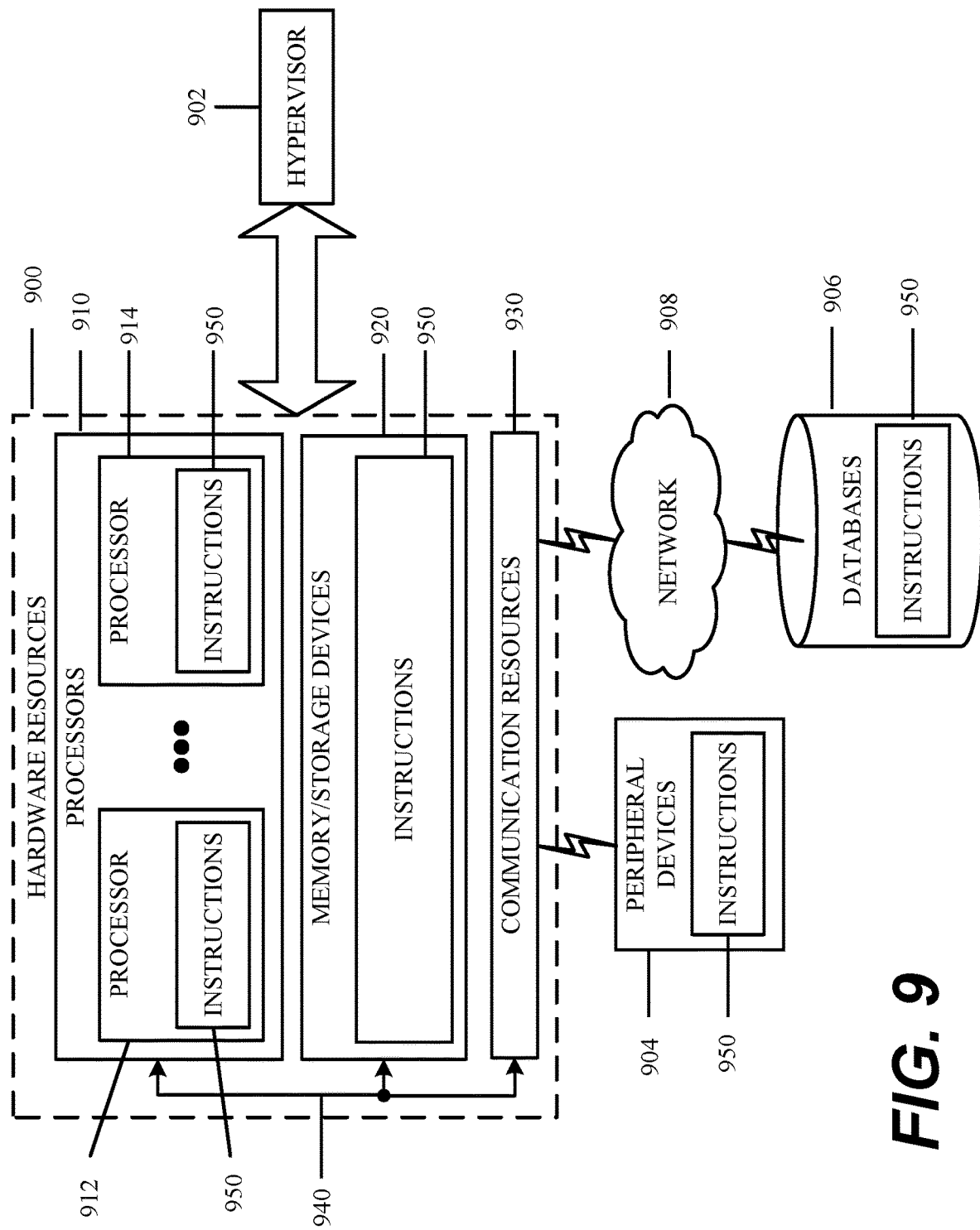
FIG. 9 illustrates an example of a computer system.

FIG. 9 illustrates a block diagram of example of a computer system that includes components for reading instructions from a machine-readable or computer-readable medium (e.g., a non-transitory machine-readable storage medium) and performing any one or more of the techniques described herein. In this example, FIG. 9 shows a diagrammatic representation of hardware resources 900 including one or more processors (or processor cores) 910, one or more memory or storage devices 920, and one or more communication resources 930, each of which may be communicatively coupled using a bus 940. For implementations where node virtualization (e.g., NFV) is utilized, a hypervisor 902 may be executed to provide an execution environment for one or more network slices or sub-slices to utilize the hardware resources 900.

The processors 910 may include a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 930 may include interconnection or network interface components or other suitable devices to communicate with one or more peripheral devices 904 or one or more databases 906 using a network 908. For example, the communication resources 930 may include wired communication components (e.g., for coupling using USB), cellular communication components, NFC components, Bluetooth® (or Bluetooth® Low Energy) components, Wi-Fi components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

In an Integrated Access and Backhaul (IAB) Network (see, e.g., 3GPP TR 38.874), an IAB node can connect to its parent node (an IAB donor or another IAB node) through parent a backhaul (BH) link; connect to a child UE through child access (AC) link; and connect to its child IAB node through a child BH link. IAB network architectures can include a central unit (CU) and a distributed unit (DU). Each IAB node can hold a DU and a Mobile-Termination (MT) function. Under the MT function, the IAB node connects to its parent IAB node or the IAB-donor like a UE. Under the DU function, the IAB node communicates with its child UEs and child MTs like a base station.

Figure 10:
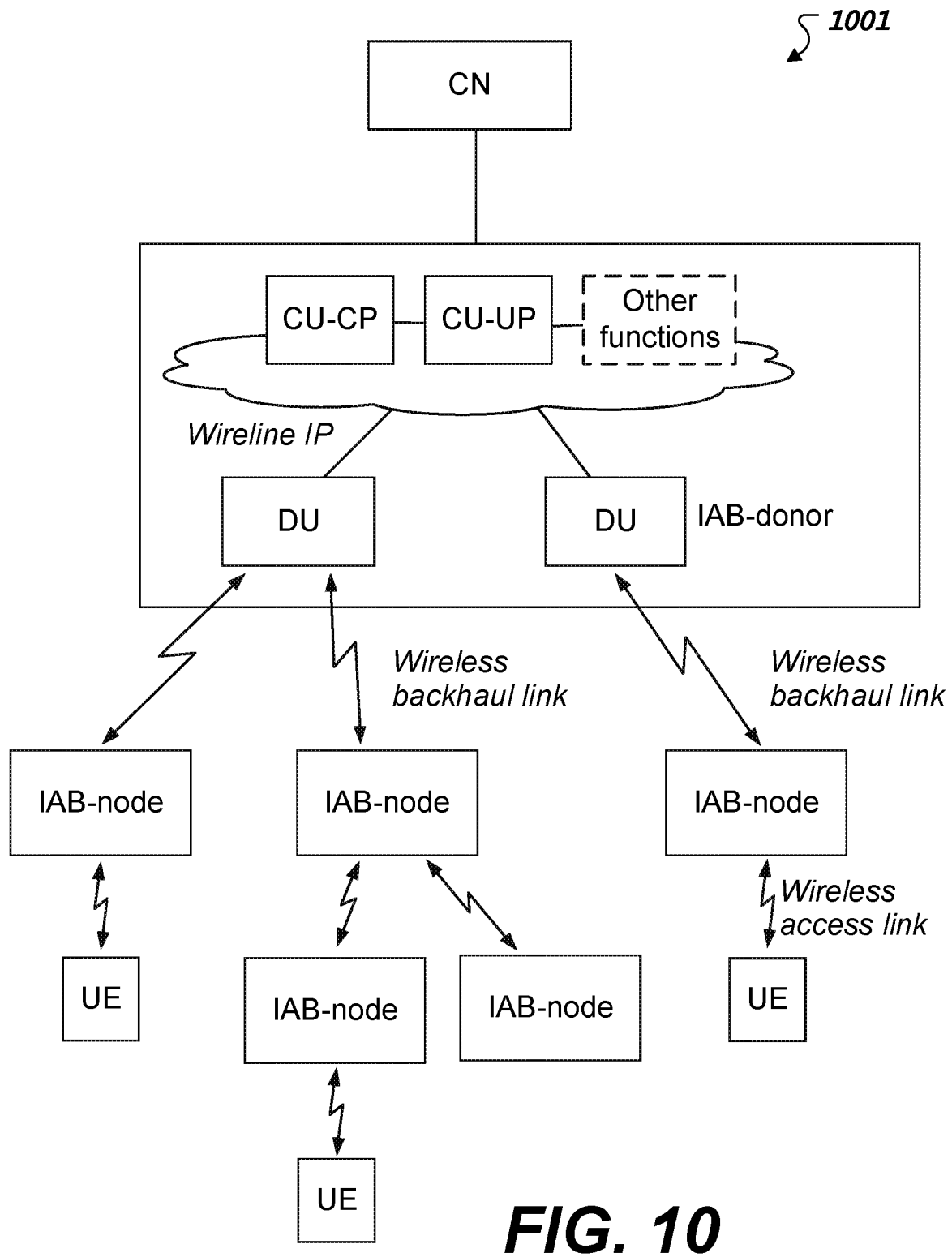
FIG. 10 illustrates a diagram of an example of an IAB architecture.

FIG. 10 illustrates a diagram of an example of an IAB architecture 1001 in standalone mode (SA mode). The IAB architecture 1001 can use the same infrastructure and spectral resources for both access and backhaul communications. In this example, the IAB architecture 1001 includes an IAB donor (also referred to as an "anchor node" or the like) and multiple IAB nodes (also referred to as IAB relay nodes (RNs), relay TRPs (rTRPs), or the like). The IAB donor is treated as a single logical node that includes a set of functions such as gNB-DU, gNB-CU-CP, gNB-CU-UP and potentially other functions. In some implementations, the IAB donor can be split according to the aforementioned functions, which can all be either collocated or non-collocated as allowed by 3GPP NG-RAN architecture. Some of the functions presently associated with the IAB donor may be moved outside of the IAB donor.

Various UEs access IAB nodes of the architecture 1001. An IAB node is a network node in an IAB deployment having UE and (at least part of) gNB functions. As shown by FIG. 10, some IAB nodes access other IAB nodes, and some IAB nodes access an IAB donor. An IAB donor is a network node in an IAB deployment that terminates NG interfaces via wired connection(s). The IAB donor is a RAN node that provides a UE's interface to a core network (e.g., the 5GC in FIG. 10, CN 220 in FIG. 2, and CN 320 in FIG. 3) and wireless backhauling functionality to IAB nodes. An IAB node is a relay node and/or a RAN node that supports wireless access to UEs and wirelessly backhaul access traffic.

IAB strives to reuse existing functions and interfaces defined for access. In particular, MT, gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. The MT function has been defined a component of the Mobile Equipment. In the context of IAB, MT is referred to as a function residing on an IAB node that terminates the radio interface layers of the backhaul Uu interface toward the IAB donor or other IAB nodes. Additional functionality, such as multi-hop forwarding, is included in the architecture.

IAB nodes can operate in SA or in NSA mode. When operating in NSA, the IAB node only uses the NR link for backhauling. The UE (e.g., UE 101 of FIG. 1) connecting to an IAB node may choose a different operation mode than the IAB node. The UE may further connect to a different type of core network than the IAB node it is connected to. In this case, (e)Decor or slicing can be used for CN selection. IAB nodes operating in NSA mode may be connected to the same or to different eNBs. UEs that also operate in NSA-node may connect to the same or to a different RAN node (e.g., RAN node 111 of FIG. 1) than the IAB node to which they are connected.

Examples for operation in SA and NSA mode include: (1) the UEs and IAB nodes operate in SA with NGC; (2) UEs operate in NSA with EPC while IAB nodes operates in SA with NGC; and (3) UEs and IAB nodes operate in NSA with EPC. For the last example, the UEs and IAB nodes operate in NSA with EPC (or 5GC for NR implementations), and the IAB node may use the LTE leg (or NR leg for NR implementations) for IAB node initial access and configuration, topology management, route selection, and resource partitioning.

In implementations where multi-hop and topology adaptation are supported, the IAB nodes can include topology management mechanisms and route selection and optimization (RSO) mechanisms. Topology management mechanisms include protocol stacks, interfaces between rTRPs or IAB nodes, control and user plane procedures for identifying one or more hops in the IAB network, forwarding traffic via one or multiple wireless backhaul links in the IAB network, handling of QoS, and the like. The RSO mechanisms include mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; and mechanisms for evaluating different resource allocations/routes across multiple nodes for end-to-end RSO.

The operation of the different links may be on the same frequencies ("in-band") or different frequencies ("out-of-band"). In-band backhauling includes scenarios where access and backhaul links at least partially overlap in frequency creating half-duplexing or interference constraints, which may imply that an IAB node may not transmit and receive simultaneously on both links. By contrast, out-of-band scenarios may not have such constraints. In implementations, one or more of the IAB nodes include mechanisms for dynamically allocating resources between backhaul and access links, which include mechanisms to efficiently multiplex access and backhaul links (for both DL and UL directions) in time, frequency, or space under a per-link half-duplex constraint across one or multiple backhaul link hops for both TDD and FDD operation; and cross-link interference (CLI) measurement, coordination and mitigation between rTRPs and UEs.

There can be five different types of IAB architectures that are divided into two architecture groups. Architecture group 1 includes architectures 1a and 1b, which include CU/DU split architectures. Architecture 1a includes backhauling of F1-U uses an adaptation layer or GTP-U combined with an adaptation layer, and hop-by-hop forwarding across intermediate nodes uses the adaptation layer for operation with NGC or PDN-connection-layer routing for operation with EPC. Architecture 1b includes backhauling of F1-U on access node uses GTP-U/UDP/IP, and hop-by-hop forwarding across intermediate node uses the adaptation layer.

Architecture group 2 includes architectures 2a, 2b, and 2c. Architecture 2a includes backhauling of F1-U or NG-U on access node uses GTP-U/UDP/IP, and hop-by-hop forwarding across intermediate node uses PDU-session-layer routing. Architecture 2b includes backhauling of F1-U or NG-U on access node uses GTP-U/UDP/IP, and hop-by-hop forwarding across intermediate node uses GTP-U/UDP/IP nested tunnelling. Architecture 2c includes backhauling of F1-U or NG-U on access node uses GTP-U/UDP/IP, and hop-by-hop forwarding across intermediate node uses GTP-U/UDP/IP/PDCP nested tunnelling.

Architecture 1a leverages CU/DU-split architecture. In this architecture, each IAB node holds a DU and an MT. Via the MT, the IAB node connects to an upstream IAB node or the IAB donor. Via the DU, the IAB node establishes RLC-channels to UEs and to MTs of downstream IAB nodes. For MTs, this RLC-channel may refer to a modified RLC*. An IAB node can connect to more than one upstream IAB node or IAB donor DU. The IAB node may contain multiple DUs, but each DU part of the IAB node has F1-C connection only with one IAB donor CU-CP.

The donor also holds a DU to support UEs and MTs of downstream IAB nodes. The IAB donor holds a CU for the DUs of all IAB nodes and for its own DU. It is FFS if different CUs can serve the DUs of the IAB nodes. Each DU on an IAB node connects to the CU in the IAB donor using a modified form of F1, which is referred to as F1*. F1*-U runs over RLC channels on the wireless backhaul between the MT on the serving IAB node and the DU on the donor. F1*-U transport between MT and DU on the serving IAB node as well as between DU and CU on the donor is FFS. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop. The F1*-U protocol stacks for this architecture include enhancements of RLC (referred to as RLC*). The MT of each IAB node further sustains NAS connectivity to the NGC, e.g., for authentication of the IAB node, and sustains a PDU-session via the NGC, e.g., to provide the IAB node with connectivity to the OAM. For NSA operation with EPC, the MT is dual-connected with the network using EN-DC. The IAB node's MT sustains a PDN connection with the EPC, e.g., to provide the IAB node with connectivity to the OAM.

Architecture 1b also leverages CU/DU-split architecture. In this architecture, the IAB donor only holds one logical CU. An IAB node can connect to more than one upstream IAB node or IAB donor DU. The IAB node may contain multiple DUs, but each DU part of the IAB node has F1-C connection only with one IAB donor CU-CP. In this architecture, each IAB node and the IAB donor hold the same functions as in architecture 1a. Also, as in architecture 1a, every backhaul link establishes an RLC-channel, and an adaptation layer is inserted to enable hop-by-hop forwarding of F1*. The MT on each IAB node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a. For NSA operation with EPC, the MT is dual-connected with the network using EN-DC. In this case, the IAB node's MT sustains a PDN connection with a L-GW residing on the donor.

An adaptation layer is inserted to enable hop-by-hop forwarding of F1*. In these implementations, the UE establishes RLC channels to the DU on the UE's access IAB-node in compliance with 3GPP TS 38.300. Each of these RLC-channels is extended via a potentially modified form of F1-U, referred to as F1*-U, between the UE's access DU and the IAB-donor. The information embedded in F1*-U is carried over RLC-channels across the backhaul links. Transport of F1*-U over the wireless backhaul is enabled by an adaptation layer, which is integrated with the RLC channel. Within the IAB-donor (referred to as fronthaul), the baseline is to use native F1-U stack (see section 9 of 3GPP TR 38.874). The IAB-donor DU relays between F1-U on the fronthaul and F1*-U on the wireless backhaul.

In architecture 1a, information carried on the adaptation layer supports the following functions: identification of the UE-bearer for the PDU; routing across the wireless backhaul topology; QoS-enforcement by the scheduler on DL and UL on the wireless backhaul link; mapping of UE user-plane PDUs to backhaul RLC channels; and other suitable functions.

In architecture 1b, information carried on the adaptation layer supports the following functions: routing across the wireless backhaul topology; QoS-enforcement by the scheduler on DL and UL on the wireless backhaul link; mapping of UE user-plane PDUs to backhaul RLC channels; and other suitable functions.

In case the IAB-node is connected via multiple paths, different identifiers (e.g., UE-bearer-specific Id; UE-specific Id; route Id, IAB-node or IAB-donor address; QoS information, etc.) in the adaptation layer will be associated with the different paths, enabling adaptation layer routing on the different paths. The different paths can be associated with different backhaul RLC-channels.

Content carried on the adaptation layer header may include, for example, UE-bearer-specific Id; UE-specific Id; route Id, IAB-node or IAB-donor address; QoS information; and/or other like information. IAB-nodes use the identifiers carried via Adapt to ensure required QoS treatment and to decide which hop a packet should be sent to. The UE-bearer-specific Id may be used by the IAB-node and the IAB-donor to identify the PDU's UE-bearer. UE's access IAB-node would then map Adapt information (e.g. UE-specific ID, UE-bearer specific ID) into the corresponding C-RNTI and LCID. The IAB-donor DU may also need to map Adapt information into the F1-U GTP-U TEID used between Donor DU and Donor CU. UE-bearer-specific Id, UE-specific Id, Route Id, or IAB-node/IAB-donor address may be used (in combination or individually) to route the PDU across the wireless backhaul topology. UE-bearer-specific Id, UE-specific Id, UE's access node IAB ID, or QoS information may be used (in combination or individually) on each hop to identify the PDU's QoS treatment. The PDU's QoS treatment may also be based on the LCID.

In some implementations, the adaptation layer may include one or more sublayers, and therefore, the adaptation header may have different structures in different implementations. For example, the GTP-U header may become a part of the adaptation layer. It is also possible that the GTP-U header is carried on top of the adaptation layer to carry end-to-end association between the IAB-node DU and the CU. Alternatively, an IP header may be part of the adaptation layer or carried on top of the adaptation layer. In one example, the IAB-donor DU holds an IP routing function to extend the IP-routing plane of the fronthaul to the IP-layer carried by adapt on the wireless backhaul. This allows native F1-U to be established e2e (e.g., between IAB-node DUs and IAB-donor CU-UP). The scenario implies that each IAB-node holds an IP-address, which is routable from the fronthaul via the IAB-donor DU. The IAB-nodes' IP addresses may further be used for routing on the wireless backhaul. Note that the IP-layer on top of Adapt does not represent a PDU session. The MT's first hop router on this IP-layer therefore does not have to hold a UPF.

In architecture 2a, UEs and IAB nodes use SA-mode with NGC. In this architecture, the IAB node holds an MT to establish an NR Uu link with a gNB on the parent IAB node or IAB donor. Via this NR-Uu link, the MT sustains a PDU-session with a UPF that is collocated with the gNB. In this manner, an independent PDU-session is created on every backhaul link. Each IAB node further supports a routing function to forward data between PDU-sessions of adjacent links. This creates a forwarding plane across the wireless backhaul. Based on PDU-session type, this forwarding plane supports IP or Ethernet. In case PDU-session type is Ethernet, an IP layer can be established on top. In this manner, each IAB node obtains IP-connectivity to the wireline backhaul network. An IAB node can connect to more than one upstream IAB node or IAB donor. All IP-based interfaces such as NG, Xn, F1, N4, etc. are carried over this forwarding plane. In the case of F1, the UE-serving IAB node would contain a DU for access links in addition to the gNB and UPF for the backhaul links. The CU for access links would reside in or beyond the IAB Donor. The NG-U protocol stack for IP-based and for Ethernet-based PDU-session type may be used for this architecture. In case the IAB node holds a DU for UE-access, it may not be required to support PDCP-based protection on each hop since the end user data will already be protected using end to end PDCP between the UE and the CU. Details are FFS. For NSA operation with EPC, the MT is dual-connected with the network using EN-DC. In this case, the IAB node's MT sustains a PDN-connection with a L-GW residing on the parent IAB node or the IAB donor. All IP-based interfaces such as S1, S5, X2, etc. are carried over this forwarding plane.

In architecture 2b, the IAB node holds an MT to establish an NR Uu link with a gNB on the parent IAB node or IAB donor. Via this NR-Uu link, the MT sustains a PDU-session with a UPF. Opposed to architecture 2a, this UPF is located at the IAB donor. Also, forwarding of PDUs across upstream IAB nodes is accomplished via tunnelling. The forwarding across multiple hops therefore creates a stack of nested tunnels. As in architecture 2a, each IAB node obtains IP-connectivity to the wireline backhaul network. All IP-based interfaces such as NG, Xn, F1, N4, etc. are carried over this forwarding IP plane. An IAB node can connect to more than one upstream IAB node or IAB donor. For NSA operation with EPC, the MT is dual-connected with the network using EN-DC. In this case, the IAB node's MT sustains a PDN-connection with a L-GW residing on the IAB donor.

Architecture 2c leverages DU-CU split. The IAB node holds an MT which sustains an RLC-channel with a DU on the parent IAB node or IAB donor. The IAB donor holds a CU and a UPF for each IAB node's DU. The MT on each IAB node sustains a NR-Uu link with a CU and a PDU session with a UPF on the donor. Forwarding on intermediate nodes is accomplished via tunnelling. The forwarding across multiple hops creates a stack of nested tunnels. As in architecture 2a and 2b, each IAB node obtains IP-connectivity to the wireline backhaul network. Opposed to architecture 2b, however, each tunnel includes an SDAP/PDCP layer. All IP-based interfaces such as NG, Xn, F1, N4, etc. are carried over this forwarding plane. An IAB node can connect to more than one upstream IAB node or IAB donor. For NSA operation with EPC, the MT is dual-connected with the network using EN-DC. In this case, the IAB node's MT sustains a PDN-connection with a L-GW residing on the IAB donor.

In some implementations, the IAB system architecture supports multi-hoping backhauling. IAB multi-hop backhauling provides more range extension than single hopping systems. Multi-hop backhauling further enables backhauling around obstacles (e.g., buildings in urban environment for in-clutter deployments). The maximum number of hops in a deployment may depend on many factors such as frequency, cell density, propagation environment, traffic load, various KPIs, and/or other like factors. Additionally, the weights assigned to each of these factors may change dynamically over time. With increasing number of hops, scalability issues may arise and limit performance or increase signaling load to unacceptable levels; therefore, scalability to hop-count may be considered as an important KPI for planning and deployment (e.g., SON) purposes. In some implementations, there may be no limits on the number of backhaul hops The IAB system architecture can support topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB nodes and/or mobile IAB nodes. Also, traffic variations can create uneven load distribution on wireless backhaul links leading to local link or node congestion. In various implementations, topology adaptation for physically fixed IAB nodes is supported to enable robust operation to mitigate blockage and load variation on backhaul links.

The IAB system architecture can support the following physical layer features: mechanisms for discovery of IAB-nodes and management of backhaul links in both SA and NSA deployments, taking into account the half-duplex constraint at an IAB-node and multi-hop topologies, including: solutions reusing the same set of SSBs used for access UEs and solutions which use of SSBs which are orthogonal based on time division multiplexing (TDM) and/or frequency division multiplexing (FDM) with SSBs used for access UEs, CSI-RS-based IAB-node discovery in synchronized deployments, backhaul link RSRP/RSRQ RRM measurements which are SSB-based and CSI-RS based; and enhancements to support configuration of backhaul RACH resources with different occasions, longer RACH periodicities, and additional preamble formats allowing for longer RTT, compared to access RACH resources without impacting Rel-15 UEs; enhancements to Beam Failure Recovery and Radio Link Failure procedures, including solutions to avoid RLF at a child IAB-node due to parent backhaul link failure; mechanisms for supporting both in-band and out-of-band relaying by multiplexing access and backhaul links in time (TDM), frequency (FDM), or space (SDM) under a per-link half-duplex constraint at the IAB-node and across multiple backhaul hops, including: semi-static configuration for IAB-node DU resources, dynamic indication to an IAB-node of the availability of soft resources for an IAB-node DU, and power control/coordination for FDM/SDM of access and backhaul links; OTA timing alignment across multiple backhaul hops, including: mechanisms for DL timing alignment across IAB-nodes, alignment of an IAB-node's UL transmission timing and DL transmission timing, and alignment of an IAB-node's UL reception timing and DL reception timing; inter-IAB-node cross-link interference (CLI) measurements and measurement coordination/configuration; and support of up to 1024QAM for backhaul links.

An IAB node has different behaviors in Stage 1 and Stage 2 (see e.g., 3GPP TR 38.874). At Stage 1, the IAB MT performs initial access like a UE and establishes a connection to a parent IAB-node or an IAB-donor. At Stage 2, the IAB DU becomes active and starts to serve child IAB nodes and/or child UEs. An IAB node connected in the network at Stage 2 can be required to transmit synchronization signal blocks (SSBs) for access UEs initial access (SSBs for access UEs) and SSBs for inter-IAB-node discovery and measurement (SSBs for inter-IAB). The present disclosure provides implementations related to SSBs for inter-IAB including structure, periodicity, etc., and different mechanisms to assign SSBs resources among IAB nodes that need to discover/measure each other.

In some implementations, SSBs for access UEs can be confined within a 5 ms half frame window. It can have different periodicities, e.g., 5, 10, 20, 40, 80, 160 ms. In some implementations, an idle UE assumes a default periodicity of 20 ms to perform initial access.

The SSB structure for inter-IAB can be the same as the SSB for access UEs at an IAB node. The SSB periodicity for access UEs and SSB periodicity for inter-IAB can be the same or different at an IAB node. The SSBs for inter-IAB can be on the sync-raster (same frequency raster as SSBs for access UEs) or on the off-raster (different frequency raster as SSBs for access UEs). Each SSB for inter-IAB can be confined within a 5 ms half frame.

For SSB candidate locations for inter-IAB, since SSBs for access UEs can be confined within a 5 ms half frame window and the default assumption of SSB periodicity for access UEs is 20 ms, time division multiplex (TDM) SSBs may be used for inter-IAB across half frames. SSBs for inter-IAB can be confined within a 5 ms half frame but is in different 5 ms half frame as SSBs for access UEs, or at least one SSB transmission for access UEs within 20 ms window is not overlapped with SSB transmission for inter-IAB. Examples of SSB candidate locations for inter-IAB with are discussed in more detail herein.

Figure 11:
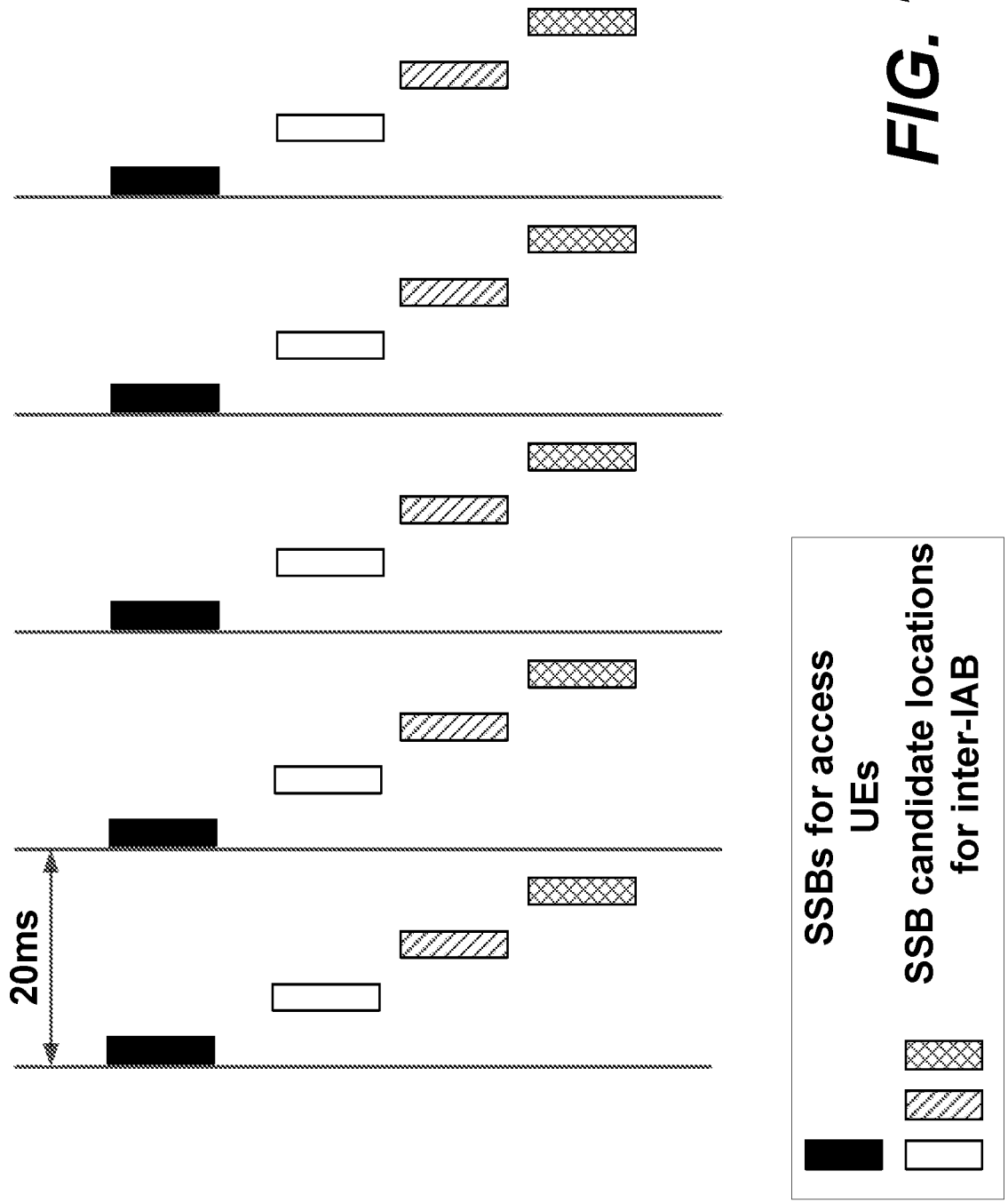
FIG. 11 illustrates an example of SSB candidate locations for inter-IAB where the SSB periodicity for access UEs and SSB periodicity for inter-IAB are both 20 ms.

FIG. 11 illustrates an example of SSB candidate locations for inter-IAB where the SSB periodicity for access UEs and SSB periodicity for inter-IAB are both 20 ms. The SSBs for access UEs are transmitted within the initial half frame of 20 ms periodicity. The initial half frame spans 1-5 ms of the 20 ms. Then, there are three SSB candidate locations within the 20 ms window for inter-IAB: the half frame spanning 5-10 ms, the half frame spanning 10-15 ms, and the last half frame spanning 15-20 ms. Note that in this case SSBs for inter-IAB cannot be transmitted at the same first half frame as the SSBs for access UEs during a 20 ms window. In other words, at least one SSB transmission for access UEs within 20 ms window needs to be not overlapped with SSB transmission for inter-IAB. If one IAB node transmit SSBs for inter-IAB and SSBs for access UEs at the same first half frame during a 20 ms window (SSBs for access UEs on sync raster and SSBs for inter-IAB on off-raster), other IAB nodes cannot measure this IAB node's SSBs for inter-IAB since at the same time they need to transmit their own SSBs for access UEs.

Figure 12:
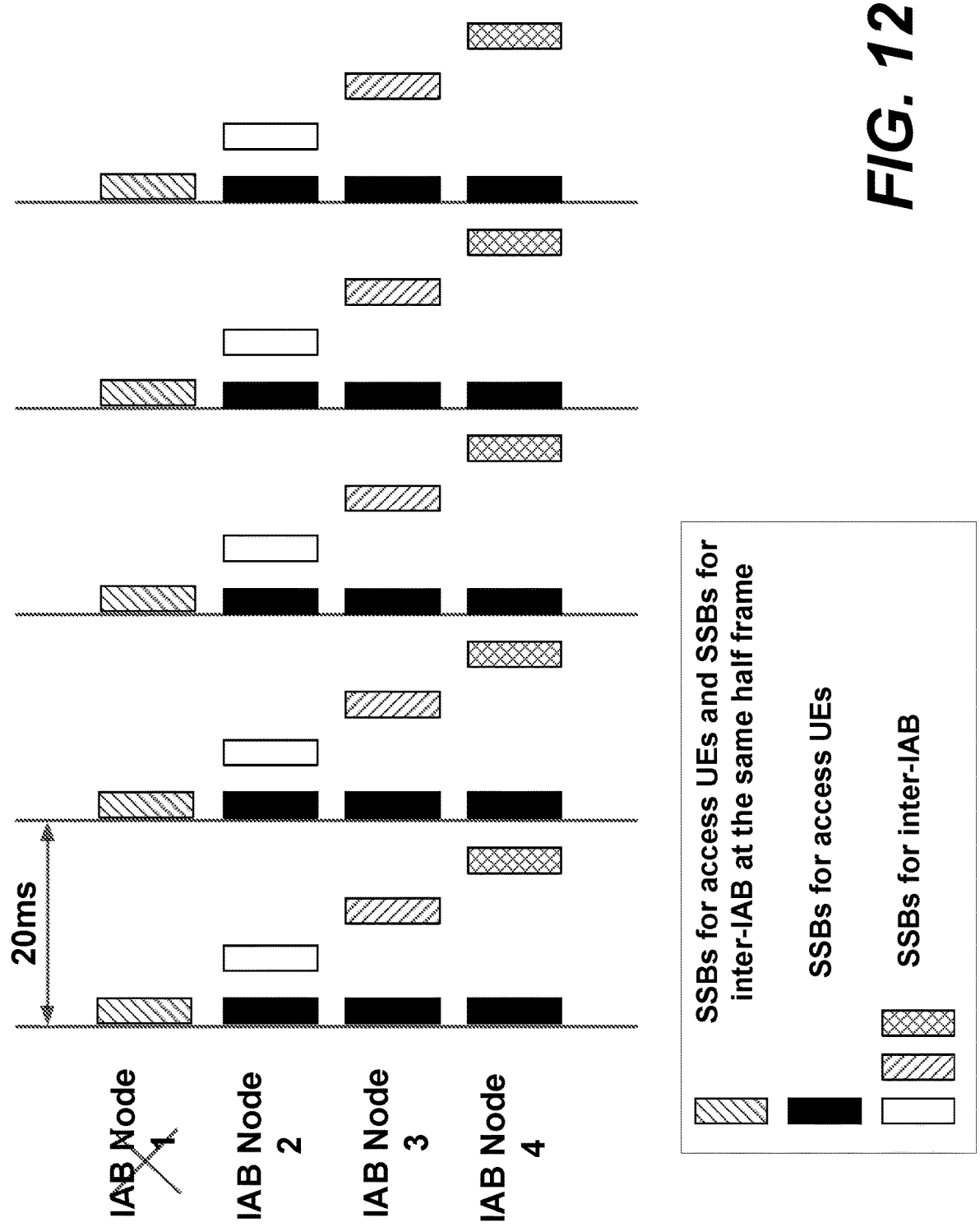
FIG. 12 illustrates an example of an IAB node transmitting SSBs for access UEs and SSBs for inter-IAB at the same beginning portion of a half frame in a 20 ms window.

FIG. 12 illustrates an example of an IAB node (labelled as IAB Node 1) transmitting SSBs for access UEs and SSBs for inter-IAB at the same beginning portion of a half frame in a 20 ms window. IAB nodes 2, 3, and 4 are transmitting SSBs for access UEs at the beginning portion of the half frame in a 20 ms window, and transmitting SSBs for inter-IAB at other half frames (e.g., candidate locations as in FIG. 11). Since other nodes cannot mute their own SSB transmission for access UEs, they do not measure the SSBs for inter-IAB for IAB Node 1 due to half-duplex constraint (and hence the cross-over of IAB Node 1 in FIG. 12). In this example, SSBs for inter-IAB do not transmit at the same beginning portion of a half frame as the SSBs for access UEs.

Figure 13:
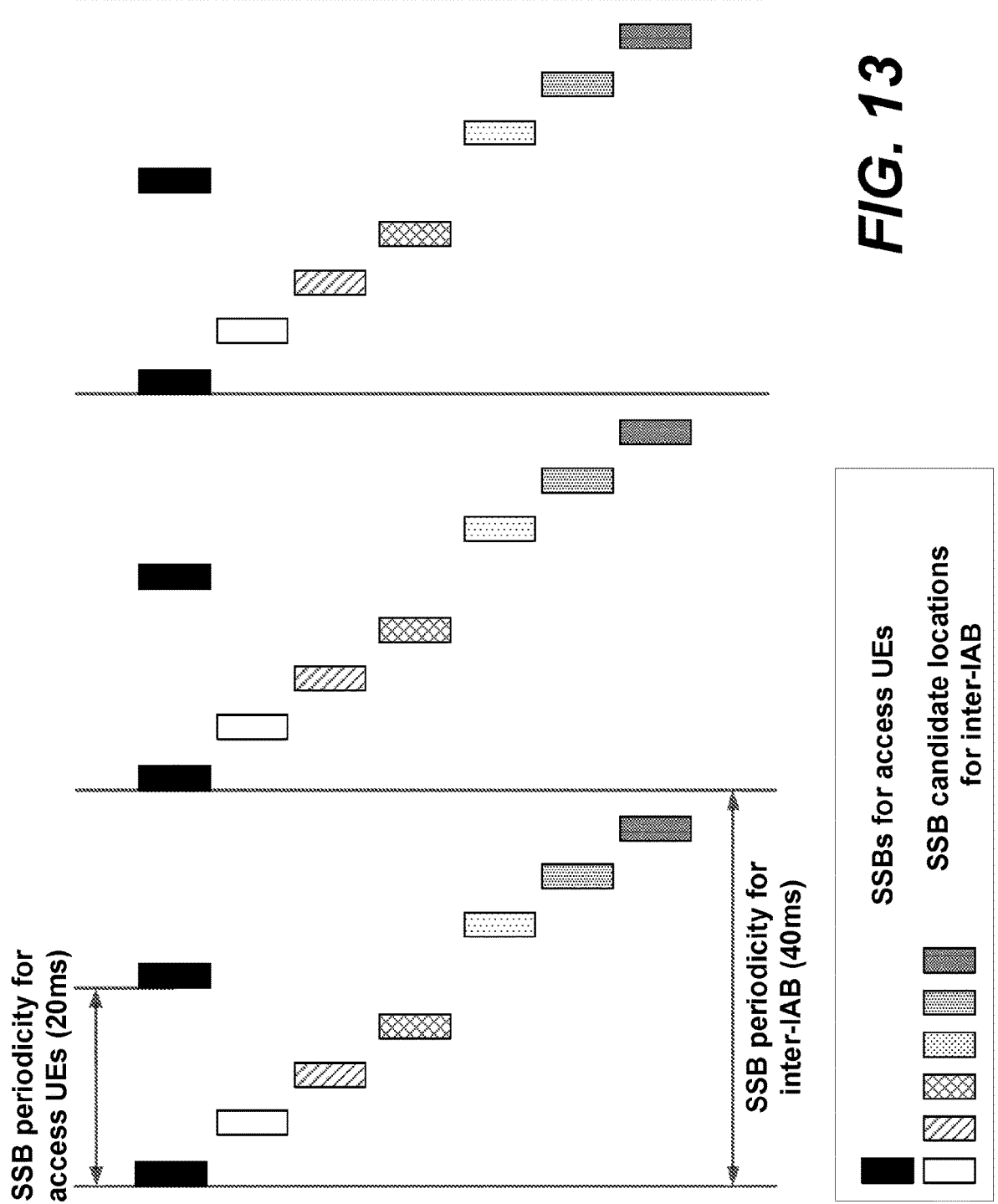
FIG. 13 illustrates an example of SSB locations where the SSB periodicity for access UEs and SSB periodicity for inter-IAB are different.

FIG. 13 illustrates an example of SSB locations where the SSB periodicity for access UEs and SSB periodicity for inter-IAB are different. The SSB periodicity for access UEs is 20 ms, and the SSB periodicity for inter-IAB is 40 ms. In this example where the SSB periodicity for inter-IAB is increased to 40 ms, the candidate locations for inter-IAB are also increased but do not overlap with the SSBs for access UEs every 20 ms. In general, if the SSB periodicity for access UEs are fixed at 20 ms and we increase the SSB periodicity for inter-IAB to 20*x ms, the number of candidate locations for inter-IAB will be 3*x.

Figure 14:
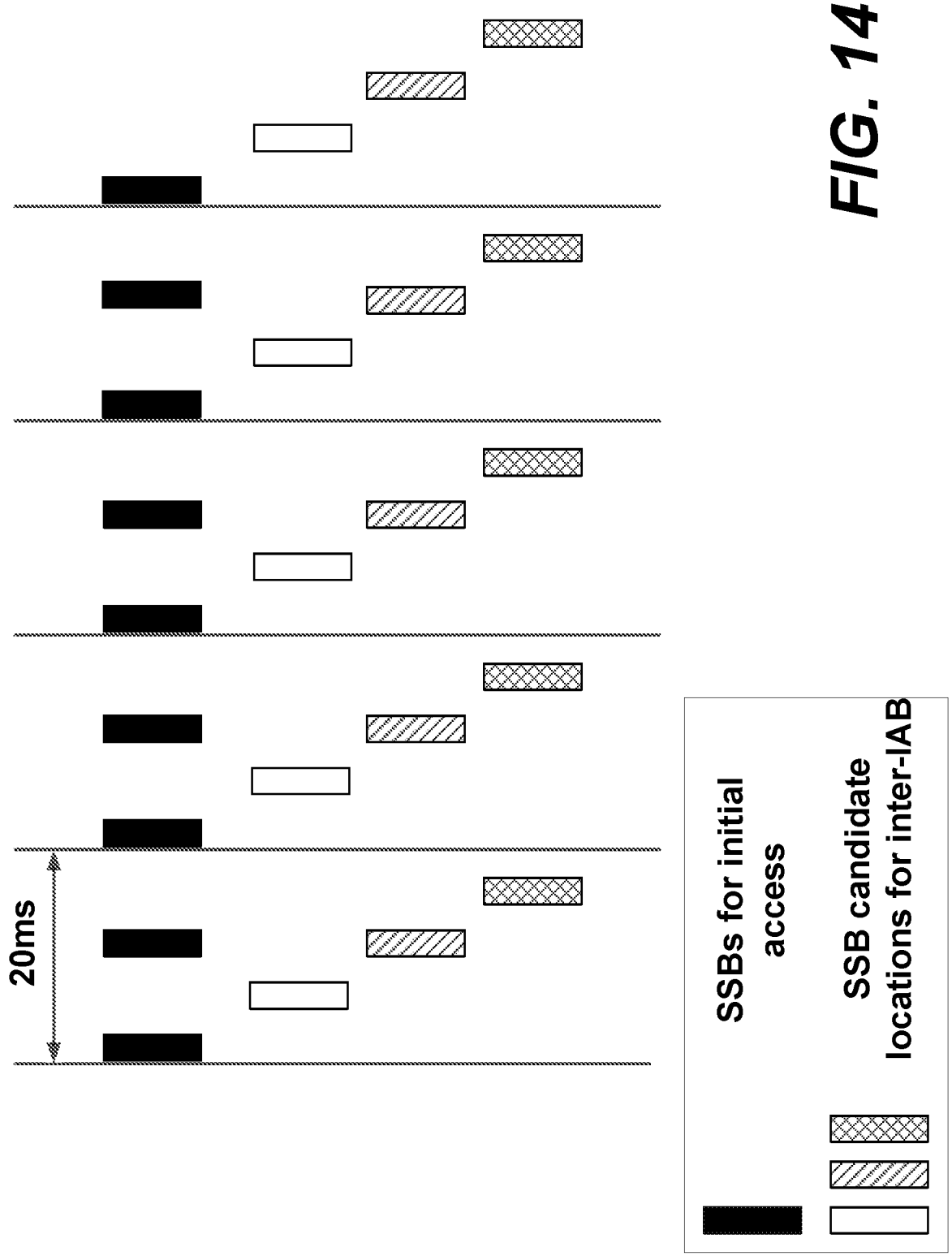
FIG. 14 illustrates another example of SSB locations where the SSB periodicity for access UEs and SSB periodicity for inter-IAB are different.

FIG. 14 illustrates another example of SSB locations where the SSB periodicity for access UEs and SSB periodicity for inter-IAB are different. In this example, SSB periodicity for access UEs is 10 ms and SSB periodicity for inter-IAB is 20 ms. The SSB candidate locations for inter-IAB are the same as FIG. 11, e.g., there is one candidate location of SSBs for inter-IAB overlapping with the second SSB for access UEs within the 20 ms window (on different frequency raster).

Figure 15:
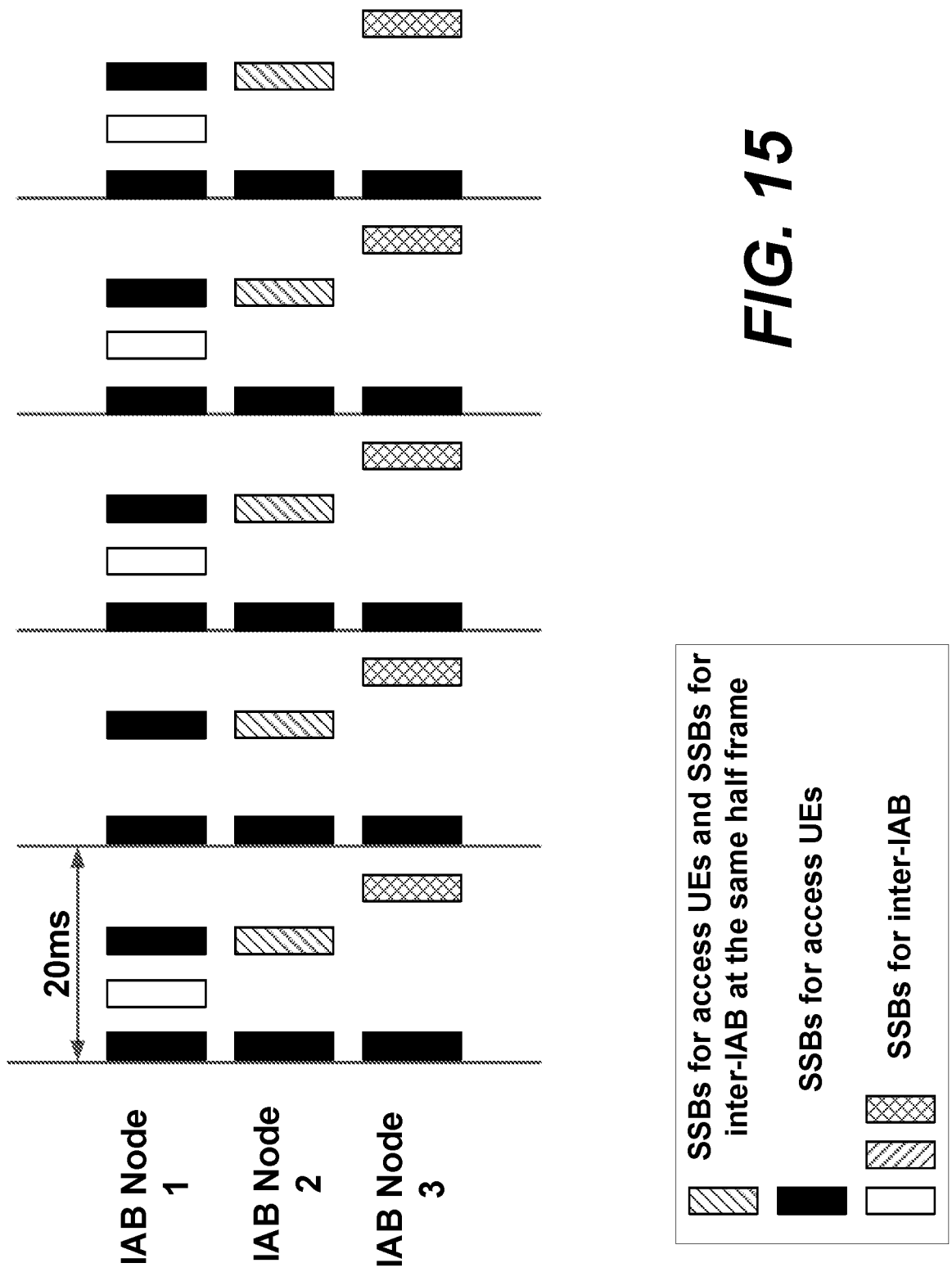
FIG. 15 illustrates an example of SSB transmissions from different nodes where the SSB for inter-IAB can transmit at the same half frame as the SSBs for access UEs.

FIG. 15 shows an example of SSB transmissions from different nodes where the SSB for inter-IAB can transmit at the same half frame as the SSBs for access UEs. In FIG. 15, at IAB node 2, for each 20 ms window, it will transmit two SSBs for access UEs, with one SSB for access UEs overlapping with SSB for inter-IAB (on different frequency raster). When IAB node 1 needs to measure SSB for inter-IAB transmitted by IAB node 2, it needs to mute its own SSB transmission for access UEs at that location. However, since the UE assumption for SSB at initial access is 20 ms, as long as a UE will detect at least one SSB for UEs at IAB node 1 during 20 ms, it can still connect to IAB node 1. If IAB node 3 needs to measure SSB for inter-IAB transmitted by IAB node 2, since it does not have its own SSBs for access UEs transmission at that time, it does not need to mute its own SSBs for access UEs.

For UE SSB measurement time configuration (SMTC) window (UE measurement after connected to the network), since it will measure the same SSBs for access UEs, the network can configure the SMTC periodicity as 20 ms, to avoid measurement at the possible muting locations of SSBs for access UEs. Other periodicity values are possible. In some implementations, the SMTC is a SSB-based measurement timing configuration configured by SSB-MeasurementTimingConfiguration.

Wireless systems can provide different configurations for SSB candidate locations for inter-IAB. In some implementations, SSBs for inter-IAB can be time division multiplexed (TDMed) with SSBs for access UEs across half frames. In some implementations, there are three SSB candidate locations within the 20 ms periodicity window for inter-IAB. In some implementations, increasing the SSB periodicity for inter-IAB can increase the number of SSB candidate locations for inter-IAB. If the SSB periodicity for inter-IAB is 20*x ms for example, the number of candidate locations for inter-IAB will be 3*x. In some implementations, if the SSB periodicity for access UEs is 20 ms, SSBs for inter-IAB discovery/measurements can be fully TDMed with SSBs for access UEs. The SSBs for inter-IAB can be in different 5 ms half frames as SSBs for access UEs, e.g., SSBs for inter-IAB and SSBs for access UEs cannot be overlapping.

If the SSB periodicity for access UEs is less than 20 ms (e.g. 5 ms, 10 ms), SSBs for inter-IAB discovery/measurements need can be partially TDMed with SSBs for access UEs in some implementations. Further, the SSBs for inter-IAB can be in the same 5 ms half frames as SSBs for access UEs, e.g., SSBs for inter-IAB and SSBs for access UEs can be overlapping. When SSBs for access UEs and SSBs for inter-IAB are overlapping in time, they can be transmitted at different frequency raster, e.g., SSBs for access UEs and SSBs for inter-IAB are frequency division multiplexed (FDMed). When SSBs for access UEs and SSBs for inter-IAB are overlapping in time, at least one SSB transmission for access UEs within 20 ms window is not overlapped with SSB transmission for inter-IAB. For an IAB node with SSBs for access UEs and SSBs for inter-IAB are overlapping in time, other IAB nodes may need to mute their own SSBs for access UEs to measure the SSBs for inter-IAB from this IAB node. For UE SMTC window, the network can configure the SMTC periodicity as 20 ms, to avoid measure at the possible muting locations of SSBs for access UEs.

The IAB nodes that are required to discover and measure each other can be assigned with orthogonal SSB locations or overlapping SSB locations depending on different design mechanisms. One assignment technique includes assigning time-orthogonal SSB resources among IAB nodes that need to discover and measure each other. Another technique includes assigning time-overlapping SSB resources among IAB nodes that need to discover and measure each other. Combinations of these techniques and other techniques are possible for allocating SSB resources among IAB Nodes for inter-IAB discovery and measurements.

Figure 16:
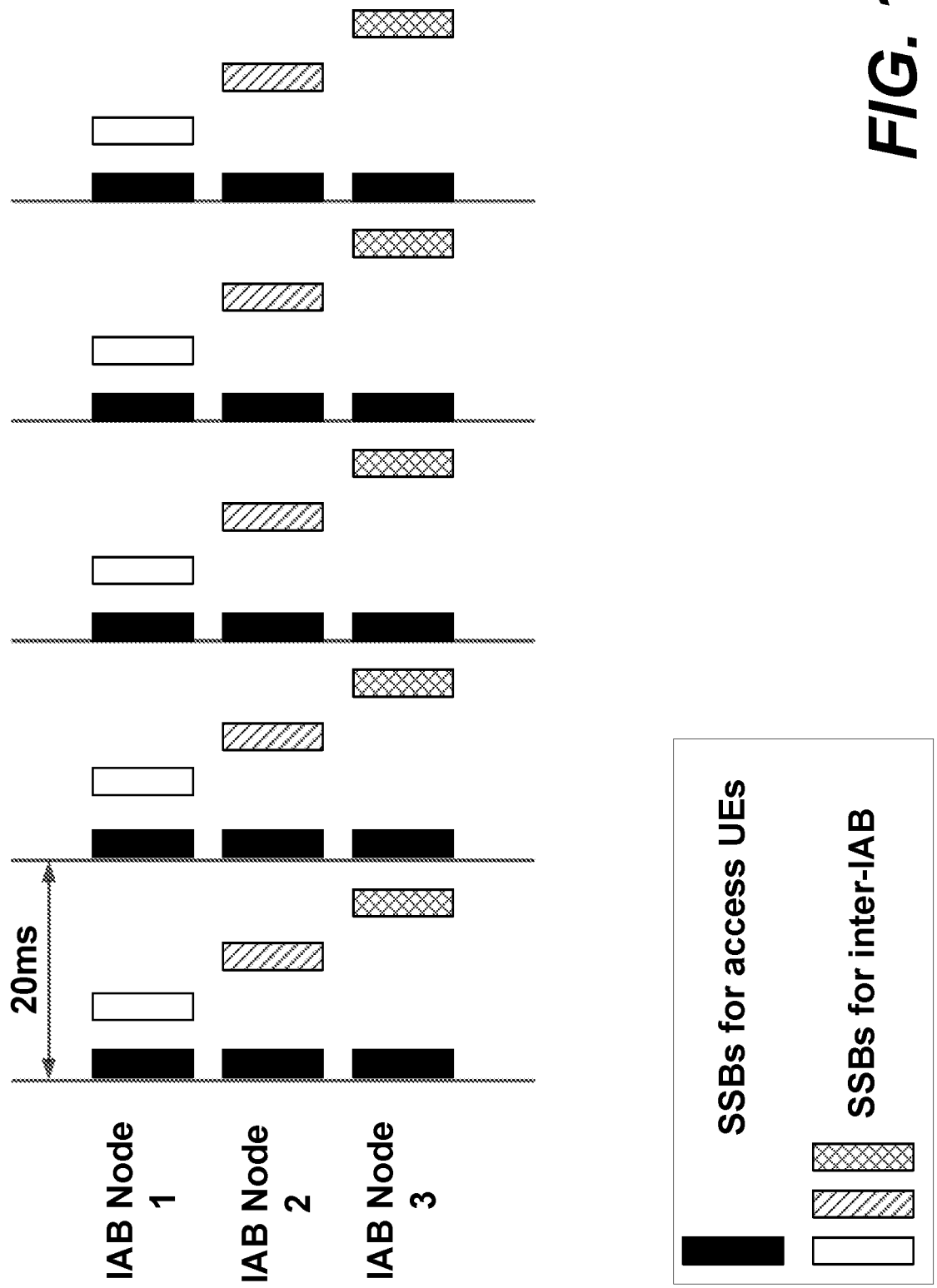
FIG. 16 illustrates an example of SSB transmissions where time-orthogonal SSB resources are assigned among IAB nodes that are required to discover and measure each other.

FIG. 16 illustrates an example of SSB transmissions where time-orthogonal SSB resources are assigned among IAB nodes that are required to discover and measure each other. IAB nodes that are required to discover and measure each other can be assigned with time-orthogonal SSB resources. For IAB nodes that are not required to discover or measure each other, the IAB nodes can be assigned with SSB resources that are overlapping in time. In this example, IAB nodes 1, 2, and 3 need to discover and measure each other. Besides transmitting its own SSBs for access UEs transmission, each of IAB nodes 1, 2, 3 can transmit SSBs for inter-IAB at orthogonal candidate locations, so that it is not required to mute its own SSBs for inter-IAB transmission to discover and measure other IAB nodes. For SMTC configuration, if there are N IAB nodes that are required to discover and measure each other, (N−1) SMTC windows can be required for an IAB node to measure the other (N−1) IAB nodes.

In some implementations, the example of FIG. 15 can also be applied to assigning time-orthogonal SSB resources among IAB nodes that need to discover and measure each other. Note that in FIG. 15, there is no muting of SSBs for inter-IAB. However, an IAB node may still need to mute its SSBs for access UEs to discover and measure SSBs for inter-IAB.

Figure 17:
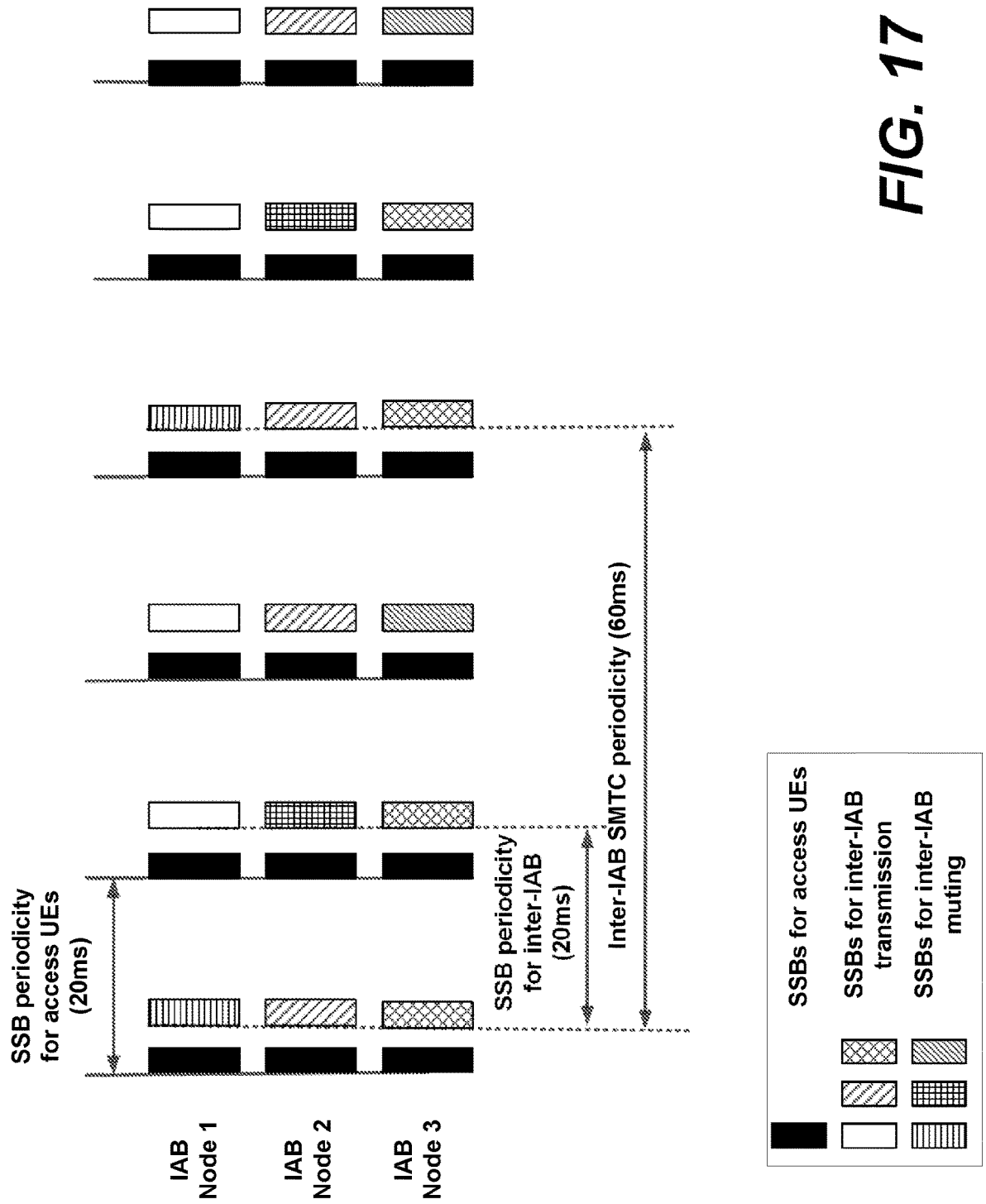
FIG. 17 illustrates an example of SSB transmissions and a muting pattern where time-overlapping SSB resources are assigned among IAB nodes that are required to discover and measure each other.

FIG. 17 illustrates an example of SSB transmissions and a muting pattern where time-overlapping SSB resources are assigned among IAB nodes that are required to discover and measure each other. IAB nodes that are required to discover and measure each other are assigned with time-overlapping SSB resources and candidate location. For IAB nodes that are not required to discover or measure each other, these IAB nodes can be assigned with SSB resources that are orthogonal in time. In this example, IAB nodes 1, 2, and 3 are required to discover and measure each other. In addition to transmitting SSBs for access UEs, each IAB node can transmit SSBs for inter-IAB at the same candidate location that overlaps. When one IAB node needs to measure SSBs for inter-IAB from other nodes, the IAN node can be required to mute its own SSBs for inter-IAB transmission. Since all SSBs for inter-IAB are transmitted at the same time for IAB nodes that are required to discover and measure each other, an IAB node can use one SMTC window to discover and measure all other IAB nodes that need to be discovered and measured.

Muting patterns can be used by IAB nodes that are required to discover and measure each other. One example muting pattern is shown by FIG. 17. In this example, the SSB periodicity for access UEs is 20 ms for IAB nodes 1, 2, and 3. The IAB nodes are assigned with a SSB candidate location for inter-IAB and the SSB periodicity for inter-IAB is 20 ms. The IAB nodes take turns to mute its own inter-IAB SSB transmission to discover and measure other IAB nodes. In some implementations, the three IAB nodes are assigned with the same SSB location for inter-IAB but have a different muting offset to discover and measure other nodes. In general for this muting pattern, for N IAB nodes that are required to discover and measure each other and the SSB periodicity for inter-IAB is Tms, the inter-IAB SMTC periodicity is N*Tms. Given that SSB periodicity for access UEs is 20 ms, the inter-IAB SMTC periodicity is 60 ms for this example.

Figure 18:
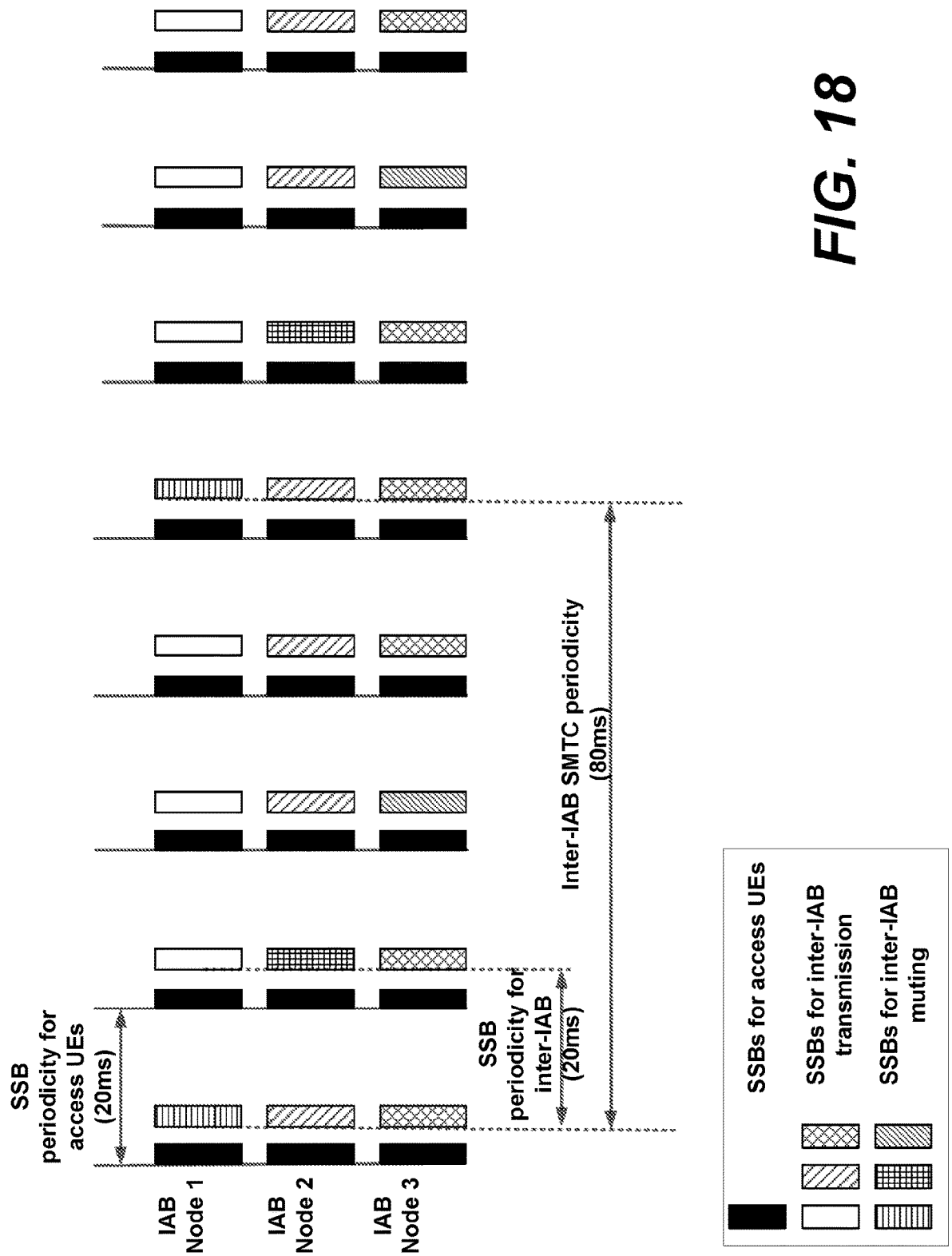
FIG. 18 illustrates another example of SSB transmissions and a muting pattern where time-overlapping SSB resources are assigned among IAB nodes that are required to discover and measure each other.

FIG. 18 illustrates another example of SSB transmissions and muting patterns where time-overlapping SSB resources are assigned among IAB nodes that are required to discover and measure each other. Similar to FIG. 17, the three IAB nodes are required to discover and measure each other, are assigned with the same SSB candidate location, and take turns to mute its own inter-IAB SSB transmission to measure other IAB nodes. After the muting for all three IAB nodes, one SSB for inter-IAB transmission can be added for all three nodes, none of them are muted, to facilitate possible measurement for all those nodes by other IAB nodes. In general for this muting pattern, for N IAB nodes that need to discover/measure each other and the SSB periodicity for inter-IAB is T ms, the inter-IAB SMTC periodicity is (N+1)*T ms. Given that SSB periodicity for access UEs is 20 ms, the inter-IAB SMTC periodicity is 80 ms for this example.

A mixture of time-orthogonal SSB resource assignments and time-overlapping SSB resource assignments are possible in some implementations. For example, IAB nodes that are required to discover and measure each other can be assigned with orthogonal SSBs for inter-IAB candidate locations or overlapping SSBs for inter-IAB candidate locations. For those IAB nodes with orthogonal SSBs for inter-IAB candidate locations, the discovery and measurement process can use time-orthogonal SSB resources among IAB nodes that need to discover/measure each other (see, e.g., FIG. 16) while for those IAB nodes with overlapping SSBs for inter-IAB candidate locations, the discovery and measurement process can use time-overlapping SSB resources (see, e.g., FIGS. 17 and 18)

Figure 19:
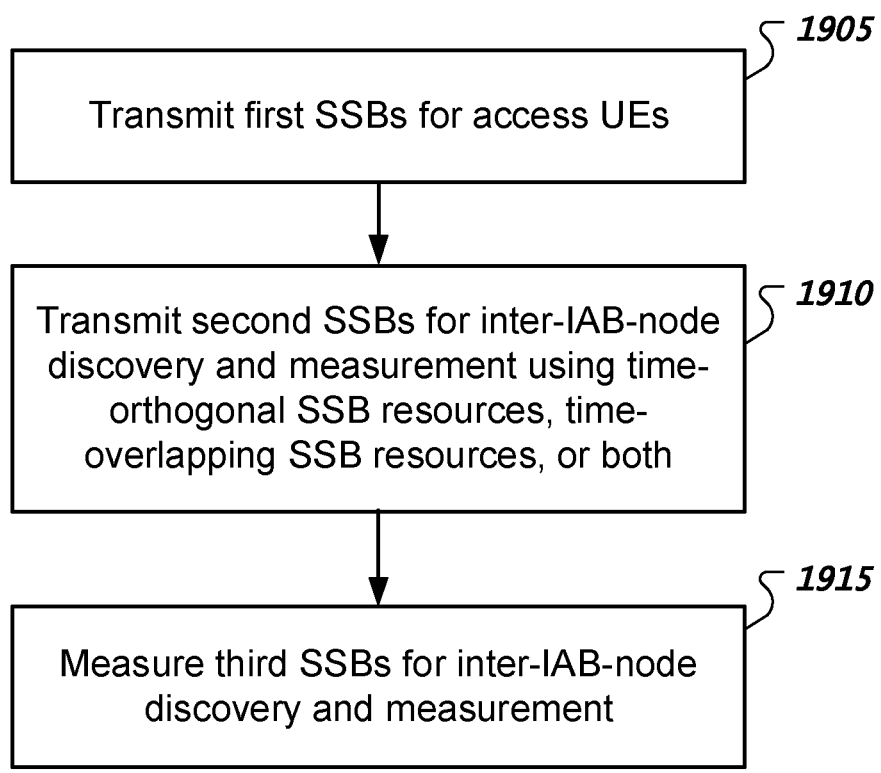
FIG. 19 illustrates a flowchart of an example process performed by an IAB node to transmit and receive SSBs.

FIG. 19 illustrates a flowchart of an example process performed by an IAB node to transmit and receive SSBs. At 1905, the IAB-node transmits first SSBs for access UEs. At 1910, the IAB-node transmits second SSBs for inter-IAB-node discovery and measurement using time-orthogonal SSB resources, time-overlapping SSB resources, or both. In some implementations, the first SSBs and the second SSBs have a same periodicity. In some implementations, the first SSBs and the second SSBs have a different periodicity. In some implementations, the first SSBs and the second SSBs are transmitted on the same frequency raster. In some implementations, the first SSBs and the second SSBs are transmitted on different frequency rasters. Transmitting the second SSBs for inter-IAB-node discovery and measurement can include using time-orthogonal SSB resources such that different ones of the IAB-nodes transmit SSBs for discovery and measurement at different times. Transmitting the second SSBs for inter-IAB-node discovery and measurement can include using time-overlapping SSB resources such that different IAB-nodes transmit SSBs for discovery and measurement at overlapping times.

At 1915, the IAB-node measures third SSBs for inter-IAB-node discovery and measurement. In some implementations, the IAB-node is configured to measure one or more third SSBs for inter-IAB-node discovery and measurement can be based on a muting pattern; and mute transmission of the second SSBs according to the muting pattern when measuring the one or more third SSBs.

An IAB SSB technique can include measuring one or more SSBs for inter-IAB-node discovery and measurement; and attaching or causing to attach to an IAB-node that is discovered or measured based on the measuring. In some implementations, the one or more SSBs have a same structure as an SSB for access UE access at the IAB-node or another IAB-node. In some implementations, the one or more SSBs have a same or different SSB periodicity as an SSB periodicity for access UEs at the IAB-node or another IAB-node. In some implementations, wherein the one or more SSBs are on a sync-raster or on off-raster, wherein when the one or more SSBs are on the sync-raster the one or more SSBs have a same frequency raster as SSBs for access UEs, and when the one or more SSBs are on the off-raster the one or more SSBs have different frequency raster as SSBs for access UEs. In some implementations, the one or more SSBs are confined within a 5 ms half frame.

The IAB SSB technique can include determining assigned time-orthogonal SSB resources/candidate locations when discovery and/or measurement of IAB-nodes is required; and determining assigned SSB resources that overlap in time when discovery and/or measurement of IAB-nodes is not required. In some implementations, the IAB-node is among a number of IAB-nodes (N), where N is a number, and N−1 SMTC windows are configured for the measuring of the N−1 IAB-nodes for SMTC configurations.

The IAB SSB technique can include determining assigned time-overlapping SSB resources and/or candidate locations when discovery and/or measurement of IAB-nodes is required; and determining assigned time-orthogonal SSB resources/candidate locations when discovery and/or measurement of IAB-nodes is not required. The IAB SSB technique can include muting an SSB transmission according to a muting pattern in order to measure the one or more SSBs. In some implementations, only one SMTC window is configured for IAB-node discovery and/or measurement. In some implementations, the muting pattern includes an SSB periodicity of T ms and an inter-IAB SMTC periodicity of N*T ms, where T is a number and N is a number of IAB-nodes to be measured. In some implementations, the muting pattern includes an SSB periodicity of T ms and an inter-IAB SMTC periodicity of (N+1)*T ms, where T is a number and N is a number of IAB-nodes to be measured.

SSBs for inter-IAB operations can include an SSB structure for inter-IAB that is the same as the SSB for access UEs at one IAB node. The SSB periodicity for access UEs and SSB periodicity for inter-IAB can be the same or different at one IAB node. SSBs for inter-IAB can be on a sync-raster or on an off-raster. The sync-raster can be a same frequency raster as SSBs for access UEs, and the off-raster can be a different frequency raster as SSBs for access UEs. In some implementations, each SSB for inter-IAB is confined within a 5 ms half frame.

In some implementations, SSBs for inter-IAB can be TDMed with SSBs for access UEs across half frames. In some implementations, IAB nodes can use different SSB locations within the 20 ms periodicity window for inter-IAB. In some implementations, increasing the SSB periodicity for inter-IAB will increase the number of SSB candidate locations for inter-IAB. In some implementations, the SSB periodicity for inter-IAB is 20*x ms, and a number of candidate locations for inter-IAB is 3*x.

In some implementations, the SSB periodicity for access UEs is 20 ms. In some implementations, SSBs for inter-IAB discovery/measurements are fully TDMed with SSBs for access UEs. In some implementations, the SSBs for inter-IAB are in different 5 ms half frames as SSBs for access UEs, e.g., SSBs for inter-IAB and SSBs for access UEs are not overlapping. In some implementations, the SSB periodicity for access UEs is less than 20 ms (e.g. 5 ms, 10 ms), and SSBs for inter-IAB discovery/measurements can be partially TDMed with SSBs for access UEs. In some implementations, the SSBs for inter-IAB can be in the same 5 ms half frames as SSBs for access UEs, e.g., SSBs for inter-IAB and SSBs for access UEs can be overlapping.

In some implementations, SSBs for access UEs and SSBs for inter-IAB can overlap in time, the SSBs can be transmitted at different frequency raster, e.g., SSBs for access UEs and SSBs for inter-IAB are FDMed. In some implementations, SSBs for access UEs and SSBs for inter-IAB can overlap in time, at least one SSB transmission for access UEs within 20 ms window is not overlapped with a SSB transmission for inter-IAB, one or more IAB nodes can be configured to mute their own SSBs for access UEs to measure the SSBs for inter-IAB from this IAB node. In some implementations, for a UE SMTC window, the network can configure the SMTC periodicity as 20 ms, to avoid measure at the possible muting locations of SSBs for access UEs.

In some implementations, the network can allocate SSB resources/candidate locations among IAB nodes for inter-IAB discover/measurements. In some implementations, time-orthogonal SSB resources are assigned among IAB nodes that need to discover/measure each other. In some implementations, there is no muting of SSBs for inter-IAB. In some implementations, an IAB node can mute its SSBs for access UEs to discover and measure SSBs for inter-IAB.

In some implementations, if there are N IAB nodes need to discover/measure each other, (N−1) SMTC windows are needed for an IAB node to measure other (N−1) IAB nodes. In some implementations, time-overlapping SSB resources are assigned among IAB nodes that need to discover/measure each other. In some implementations, IAB nodes that need to discover and measure each other are assigned with the same SSB resources for inter-IAB but have different muting offset to discover and measure others. In some implementations, an IAB node is configured to use one SMTC window to discover/measure other IAB nodes that need to be discovered/measured. In some implementations, a muting pattern is defined among IAB nodes that need to discover/measure each other.

In some implementations, the muting pattern (muting pattern 1) involves IAB nodes that need to discover/measure each other take turns to mute its own inter-IAB SSB transmission to discover/measure other IAB nodes, wherein for N IAB nodes that need to discover/measure each other and the SSB periodicity for inter-IAB is T ms, the inter-IAB SMTC periodicity is N*T ms. In some implementations, the muting pattern (muting pattern 2) involves IAB nodes that need to discover/measure each other take turns to mute its own inter-IAB SSB transmission to discover/measure other IAB nodes, wherein after the muting for all IAB nodes, we add one SSB for inter-IAB transmission for all IAB nodes that need to discover/measure each other, none of them are muted, to facilitate possible measurement for all those nodes by other IAB nodes, wherein for N IAB nodes that need to discover/measure each other and the SSB periodicity for inter-IAB is T ms, the inter-IAB SMTC periodicity is (N+1)*T ms.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these implementations, the combination of hardware elements and program code may be referred to as a particular type of circuitry. Circuitry can also include radio circuitry such as a transmitter, receiver, or a transceiver.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of operating an Integrated Access and Backhaul (IAB) node comprising:
   transmitting, by an IAB-node, first synchronization signal blocks (SSBs) for access user equipment (UEs); and
   transmitting, by the IAB-node, second SSBs for inter-IAB-node discovery and measurement, wherein transmitting the second SSBs for inter-IAB-node discovery and measurement comprises:
   using time-overlapping SSB resources such that different IAB-nodes transmit SSBs for discovery and measurement at overlapping times;

measuring one or more third SSBs for inter-IAB-node discovery and measurement based on a muting pattern in one or more SSB measurement time configuration (SMTC) windows, wherein the IAB-node is among a group of IAB-nodes (N), where N is a number, and a number of SMTC windows configured for measuring of the IAB-nodes is based on N; and muting transmission of the second SSBs according to the muting pattern when measuring the one or more third SSBs, wherein the muting pattern includes a SSB periodicity of T milliseconds and an inter-IAB SMTC periodicity of N*T milliseconds.

2. The method of claim 1, wherein the first SSBs and the second SSBs have a same periodicity.

3. The method of claim 1, wherein the first SSBs and the second SSBs have a different periodicity.

4. The method of claim 1, wherein the first SSBs and the second SSBs are transmitted on the same frequency raster.

5. The method of claim 1, wherein the first SSBs and the second SSBs are transmitted on different frequency rasters.

6. The method of claim 1, wherein each of the second SSBs is confined within a five millisecond half frame.

7. The method of claim 1, further comprising:
attaching to another IAB-node that is discovered based on the measuring.

8. An apparatus comprising:
one or more processors;
circuitry to communicate with devices comprising one or more user equipment (UEs) and one or more Integrated Access and Backhaul (IAB) nodes; and
a memory storing instructions that, when executed by the one or more processors, cause the one or more processors to perform operations comprising:
  transmitting first synchronization signal blocks (SSBs) for access UEs; and
  transmitting, by the IAB-node, second SSBs for inter-IAB-node discovery and measurement, wherein transmitting the second SSBs for inter-IAB-node discovery and measurement comprises:
    using time-overlapping SSB resources such that different IAB-nodes transmit SSBs for discovery and measurement at overlapping times;
    measuring one or more third SSBs for inter-IAB-node discovery and measurement based on a muting pattern in one or more SSB measurement time configuration (SMTC) windows, wherein the IAB-node is among a group of IAB-nodes (N), where N is a number, and a number of SMTC windows configured for measuring of the IAB-nodes is based on N; and
    muting transmission of the second SSBs according to the muting pattern when measuring the one or more third SSBs, wherein the muting pattern includes a SSB periodicity of T milliseconds and an inter-IAB SMTC periodicity of (N+1)*T milliseconds.

9. The apparatus of claim 8, wherein the first SSBs and the second SSBs have a same periodicity.

10. The apparatus of claim 8, wherein the first SSBs and the second SSBs have a different periodicity.

11. The apparatus of claim 8, wherein the first SSBs and the second SSBs are transmitted on the same frequency raster.

12. The apparatus of claim 8, wherein the first SSBs and the second SSBs are transmitted on different frequency rasters.

13. The apparatus of claim 8, wherein each of the second SSBs is confined within a five millisecond half frame.

14. The apparatus of claim 8, the operations further comprising:
attaching to another IAB-node that is discovered based on the measuring.

15. One or more processors to perform operations comprising:
transmitting first synchronization signal blocks (SSBs) for access UEs; and
transmitting, by the IAB-node, second SSBs for inter-IAB-node discovery and measurement, wherein transmitting the second SSBs for inter-IAB-node discovery and measurement comprises:
  using time-overlapping SSB resources such that different IAB-nodes transmit SSBs for discovery and measurement at overlapping times;
  measuring one or more third SSBs for inter-IAB-node discovery and measurement based on a muting pattern in one or more SSB measurement time configuration (SMTC) windows, wherein the IAB-node is among a group of IAB-nodes (N), where N is a number, and a number of SMTC windows configured for measuring of the IAB-nodes is based on N; and
  muting transmission of the second SSBs according to the muting pattern when measuring the one or more third SSBs, wherein the muting pattern includes a SSB periodicity of T milliseconds and an inter-IAB SMTC periodicity of (N+1)*T milliseconds.

16. The apparatus of claim 15, wherein the first SSBs and the second SSBs have a same periodicity.

17. The apparatus of claim 15, wherein the first SSBs and the second SSBs have a different periodicity.

18. The apparatus of claim 15, wherein the first SSBs and the second SSBs are transmitted on the same frequency raster.

19. The apparatus of claim 15, wherein the first SSBs and the second SSBs are transmitted on different frequency rasters.

20. The apparatus of claim 15, wherein each of the second SSBs is confined within a five millisecond half frame.

21. The apparatus of claim 15, the operations further comprising:
attaching to another IAB-node that is discovered based on the measuring.

* * * * *